(12) United States Patent
Wen et al.

(10) Patent No.: US 10,499,270 B2
(45) Date of Patent: Dec. 3, 2019

(54) CHANNEL QUALITY REPORTING METHOD AND APPARATUS

(71) Applicant: Huawei Technologies Co., Ltd., Shenzhen (CN)

(72) Inventors: Ronghui Wen, Beijing (CN); Yongxia Lyu, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 351 days.

(21) Appl. No.: 15/423,804

(22) Filed: Feb. 3, 2017

(65) Prior Publication Data
US 2017/0150388 A1 May 25, 2017

Related U.S. Application Data

(63) Continuation of application No. PCT/CN2014/083630, filed on Aug. 4, 2014.

(51) Int. Cl.
*H04W 24/10* (2009.01)
*H04L 5/00* (2006.01)
*H04W 72/12* (2009.01)

(52) U.S. Cl.
CPC ............ *H04W 24/10* (2013.01); *H04L 5/00* (2013.01); *H04W 72/1231* (2013.01)

(58) Field of Classification Search
CPC ...... H04W 24/10; H04W 72/1231; H04L 5/00
See application file for complete search history.

(56) References Cited

U.S. PATENT DOCUMENTS

| 2009/0154588 | A1  | 6/2009  | Chen et al. |
| 2011/0249643 | A1* | 10/2011 | Barbieri ............... H04L 1/0026 370/329 |
| 2012/0213095 | A1  | 8/2012  | Krishnamurthy et al. |
| 2013/0244681 | A1  | 9/2013  | Ookubo et al. |
| 2014/0073339 | A1  | 3/2014  | Yang |
| 2014/0126402 | A1  | 5/2014  | Nam et al. |
| 2014/0185495 | A1* | 7/2014  | Kuchibhotla ........... H04L 5/001 370/281 |
| 2015/0003359 | A1  | 1/2015  | Hoshino et al. |
| 2015/0249998 | A1* | 9/2015  | Long ..................... H04W 24/02 370/329 |

FOREIGN PATENT DOCUMENTS

| CN | 102907036 A | 1/2013 |
| CN | 103270714 A | 8/2013 |

(Continued)

*Primary Examiner* — Rina C Pancholi
(74) *Attorney, Agent, or Firm* — Slater Matsil, LLP

(57) ABSTRACT

A channel quality reporting apparatus includes: a processing module and a sending module. The processing module performs channel state measurement on a first frequency resource of a first carrier to obtain first CSI, and performs channel state measurement on a second frequency resource of the first carrier to obtain second CSI, where the first frequency resource and the second frequency resource do not overlap, resource blocks in the first frequency resource are consecutive, resource blocks in the second frequency resource are consecutive, and the second frequency resource includes an edge resource block of the first carrier. The sending module reports the first CSI to a second communications device, and report the second CSI to the second communications device.

18 Claims, 14 Drawing Sheets

---

A first communications device performs channel state measurement on a first frequency resource of a first carrier to obtain first CSI, where the first CSI is channel state information corresponding to the first frequency resource of the first carrier — S1101

The first communications device performs channel state measurement on a second frequency resource of the first carrier to obtain second CSI, where the second CSI is channel state information corresponding to the second frequency resource of the first carrier, the first frequency resource and the second frequency resource do not overlap, resource blocks in the first frequency resource are consecutive, resource blocks in the second frequency resource are consecutive, and the second frequency resource includes an edge resource block of the first carrier — S1102

The first communications device reports information about the first CSI and information about the second CSI to a second communications device — S1103

(56) References Cited

FOREIGN PATENT DOCUMENTS

| CN | 103326761 A | 9/2013 |
| CN | 103460635 A | 12/2013 |
| JP | 2012114821 A | 6/2012 |
| JP | 2014517598 A | 7/2014 |
| WO | 2013111525 A1 | 8/2013 |
| WO | 2013141338 A1 | 9/2013 |
| WO | 2013145787 A1 | 10/2013 |
| WO | 2013169196 A1 | 11/2013 |

* cited by examiner

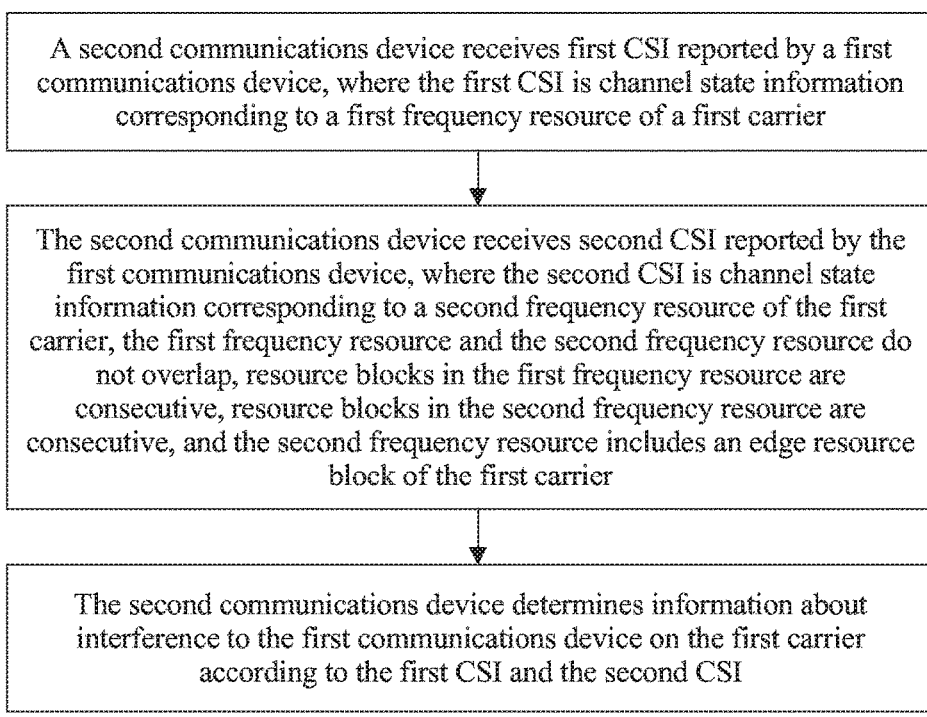

CHANNEL QUALITY REPORTING METHOD AND APPARATUS

CROSS-REFERENCE TO RELATED APPLICATIONS

This application is a continuation of International Application No. PCT/CN2014/083630, filed on Aug. 4, 2014, the disclosure of which is hereby incorporated by reference in its entirety.

TECHNICAL FIELD

Embodiments of the present invention relate to the field of wireless communications technologies, and in particular, to a channel quality reporting method and an apparatus.

BACKGROUND

In a wireless communications network, user equipment (UE) transmits data on a resource allocated to the user equipment by a base station. The base station determines, according to received channel state information (CSI) obtained by means of measurement by the UE, whether the UE receives interference, and schedules another resource for UE that receives interference by using a resource scheduling method.

There are many types of interference to the UE. If the UE receives interference from an uplink signal of other UE in the network, the UE that receives interference normally receives interference only on some frequency bands or some time-frequency resources regardless of whether the UE that causes interference belongs to the same operator and system as the UE that receives interference or does not belong to the same operator or system as the UE that receives interference.

Currently, there are mainly three CSI measurement reporting methods, as described below.

A first method is a wideband CSI solution. That is, UE reports an average channel state of an entire frequency band. When the UE receives interference from an uplink signal of other UE, it is possible that channel quality of only some frequency bands or some time-frequency resources is relatively poor, but channel quality of other frequency bands is relatively good. Therefore, the average channel state of the entire frequency band cannot reflect actual channel states of frequency bands or time-frequency resources that receive interference.

A second method is an optimal M-subband CSI solution. That is, UE reports channel states of M subbands with optional channel conditions. However, because channel quality of frequency bands or time-frequency resources that receive interference is relatively poor, the channel states of the M subbands with optional channel conditions do not include channel states of these subbands with relatively poor channel quality. Therefore, this solution cannot reflect actual channel states of the frequency bands or time-frequency resources that receive interference, either.

A third method is a subband CSI solution. That is, UE reports a channel state of each subband of an entire frequency band. Although this solution can reflect actual channel states of frequency bands or time-frequency resources that receive interference, a relatively large quantity of resources need to be occupied to report the channel state of each subband of the entire frequency band, and a base station needs to deliver control signaling to trigger reporting of the UE.

In conclusion, how to more accurately and effectively report whether UE receives interference from other UE is to be urgently resolved in the wireless communications network.

SUMMARY

Embodiments of the present invention provide a channel quality reporting method and an apparatus, to accurately and effectively measure and report interference to user equipment.

A first aspect provides user equipment. The user equipment includes a processing module, configured to: perform channel state measurement on a first frequency resource of a first carrier to obtain first CSI, where the first CSI is channel state information corresponding to the first frequency resource of the first carrier; and perform channel state measurement on a second frequency resource of the first carrier to obtain second CSI, where the second CSI is channel state information corresponding to the second frequency resource of the first carrier, the first frequency resource and the second frequency resource do not overlap, resource blocks in the first frequency resource are consecutive, resource blocks in the second frequency resource are consecutive, and the second frequency resource includes an edge resource block of the first carrier. The user equipment also includes a sending module, configured to report information about the first CSI and information about the second CSI to a second communications device.

A second aspect provides a network device. The network device includes a receiving module, configured to receive information about first CSI and information about second CSI that are reported by a first communications device, where the information about the first CSI is information about channel state information corresponding to a first frequency resource of a first carrier, the information about the second CSI is information about channel state information corresponding to a second frequency resource of the first carrier, the first frequency resource and the second frequency resource do not overlap, resource blocks in the first frequency resource are consecutive, resource blocks in the second frequency resource are consecutive, and the second frequency resource includes an edge resource block of the first carrier; and a processing module, configured to determine information about interference to the first communications device on the first carrier according to the information about the first CSI and the information about the second CSI.

A third aspect provides user equipment. The user equipment includes a processing module, configured to: perform channel state measurement on a first carrier to obtain CSI of each subband or each scheduling unit of the first carrier, where the scheduling unit is a smallest time-frequency resource unit scheduled in a wireless communications system in which the first communications device is located; and determine information about interference on the first carrier according to the CSI of each subband or each scheduling unit. The user equipment also includes a sending module, configured to report the interference information to a second communications device.

A fourth aspect provides a network device. The network device also includes a receiving module, configured to receive information, which is reported by a first communications device, about interference to the first communications device on a first carrier, where the interference information is determined by the first communications device according to CSI of each subband or each scheduling unit.

The network device also includes a processing module, configured to determine the information about interference to the first communications device on the first carrier according to the interference information.

A fifth aspect provides a channel quality reporting method. The method includes performing, by a first communications device, channel state measurement on a first frequency resource of a first carrier to obtain first CSI, where the first CSI is channel state information corresponding to the first frequency resource of the first carrier. The method also includes performing, by the first communications device, channel state measurement on a second frequency resource of the first carrier to obtain second CSI, where the second CSI is channel state information corresponding to the second frequency resource of the first carrier, the first frequency resource and the second frequency resource do not overlap, resource blocks in the first frequency resource are consecutive, resource blocks in the second frequency resource are consecutive, and the second frequency resource includes an edge resource block of the first carrier; and reporting, by the first communications device, information about the first CSI and information about the second CSI to a second communications device.

A sixth aspect provides a channel quality reporting method. The method includes receiving, by a second communications device, information about first CSI and information about second CSI that are reported by a first communications device, where the information about the first CSI is information about channel state information corresponding to a first frequency resource of a first carrier, the information about the second CSI is information about channel state information corresponding to a second frequency resource of the first carrier, the first frequency resource and the second frequency resource do not overlap, resource blocks in the first frequency resource are consecutive, resource blocks in the second frequency resource are consecutive, and the second frequency resource includes an edge resource block of the first carrier; and determining, by the second communications device, information about interference to the first communications device on the first carrier according to the information about the first CSI and the information about the second CSI.

A seventh aspect provides a channel quality reporting method. The method includes performing, by a first communications device, channel state measurement on a first carrier to obtain CSI of each subband or each scheduling unit of the first carrier, where the scheduling unit is a smallest time-frequency resource unit scheduled in a wireless communications system in which the first communications device is located. The method also includes determining, by the first communications device, information about interference on the first carrier according to the CSI of each subband or each scheduling unit. The method also includes reporting, by the first communications device, the interference information to a second communications device.

An eighth aspect provides a channel quality reporting method. The method includes receiving, by a second communications device, information, which is reported by a first communications device, about interference to the first communications device on a first carrier, where the interference information is determined by the first communications device according to CSI of each subband or each scheduling unit. The method also includes determining, by the second communications device, the information about interference to the first communications device on the first carrier according to the interference information.

According to the channel quality reporting method and the apparatus provided in the embodiments of the present invention, a first frequency resource and a second frequency resource of a first carrier are measured to obtain first CSI and second CSI respectively, and information about the first CSI and information about the second CSI are reported to a second communications device, where the first frequency resource and the second frequency resource do not overlap, and the second frequency resource includes at least an edge resource block of the first carrier. In this way, user equipment can independently and accurately measure and report a channel state.

BRIEF DESCRIPTION OF THE DRAWINGS

FIG. 16 is a schematic diagram of a sixth embodiment of the channel quality reporting method provided in the embodiments of the present invention;

FIG. 17 is a schematic diagram of a seventh embodiment of the channel quality reporting method provided in the embodiments of the present invention;

DETAILED DESCRIPTION OF ILLUSTRATIVE EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
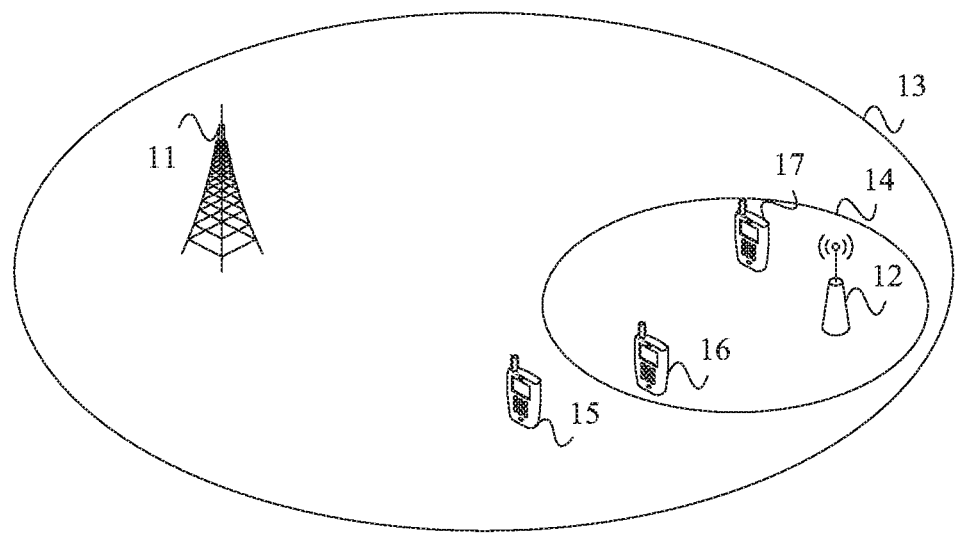
FIG. 1 is a schematic diagram of a heterogeneous network architecture.

FIG. 1 is a schematic diagram of a heterogeneous network architecture. As shown in FIG. 1, a network includes a macro base station 11 and a micro base station 12. An area 13 is a coverage area of the macro base station 11, and an area 14 is a coverage area of the micro base station 12. UE 15 is located in the area 13 and connected to the macro base station 11, and UE 16 and UE 17 are located in the area 14 and connected to the micro base station 12.

The macro base station 11 and the micro base station 12 may be base stations that belong to different operators respectively, and frequency bands of the macro base station 11 and the micro base station 12 are adjacent. Certainly, alternatively, the macro base station 11 and the micro base station 12 may be base stations of a same operator. A distance between the UE 15 and the UE 16 is shorter, and a distance between the UE 15 and the UE 17 is longer. Therefore, a path loss for an uplink signal of the UE 15 to arrive at the UE 16 is smaller, and a path loss for an uplink signal of the UE 15 to arrive at the UE 17 is greater. That is, the uplink signal of the UE 15 has smaller signal attenuation and greater strength when arriving at the UE 16. When adjacent edge frequency band resources are scheduled for the UE 15 and the UE 16 respectively, and the UE 15 sends uplink data, adjacent-channel leakage of the UE 15 may cause interference to a frequency band for receiving downlink data by the UE 16.

Figure 2:
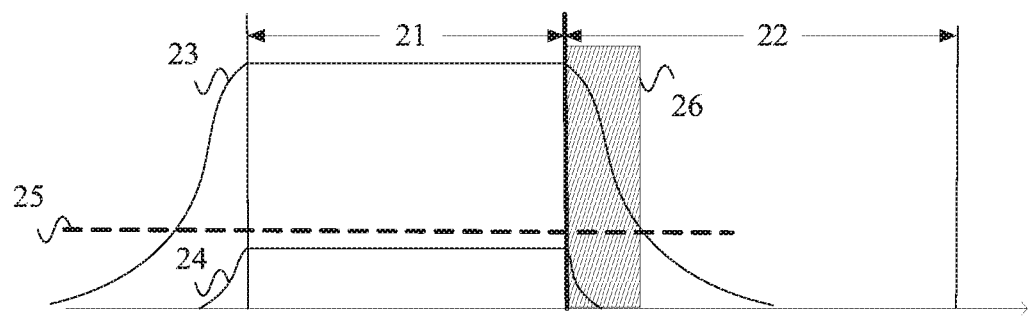
FIG. 2 is a schematic diagram of adjacent-channel interference in a network shown in FIG. 1.

FIG. 2 is a schematic diagram of adjacent-channel interference in the network shown in FIG. 1. As shown in FIG. 2, a horizontal axis represents frequency, and a vertical axis represents amplitude. A region 21 on the horizontal axis is an uplink transmission frequency band of the UE 15, and a region 22 is a downlink transmission frequency band of the UE 16 and the UE 17. The region 21 is an edge frequency band of a system or an operator to which the UE 15 belongs, and the region 22 is an edge frequency band of a system or an operator to which the UE 16 and the UE 17 belong. A curve 23 is a spectrum waveform of an uplink transmission signal of the UE 15; and a curve 24 is a spectrum waveform of an uplink transmission signal of the UE 15. A dashed line 25 is an interference tolerance threshold of the system in which the UE 16 and the UE 17 are located. Interference above the dashed line 25 affects downlink transmission of the UE 16 and the UE 17. It may be seen from FIG. 2 that the UE 15 causes interference to the UE 16 and the UE 17, but it may be seen from the curve 24 that interference from the UE 15 to the UE 17 does not exceed the interference tolerance threshold of the UE 17. Therefore, uplink transmission of the UE 15 does not affect downlink transmission of the UE 17. However, it may be seen from the curve 23 that, on a frequency band in a region 26, interference from the UE 15 to the UE 16 is greater than the interference tolerance threshold of the UE 16. That is, on the frequency band in the region 26, downlink transmission of the UE 16 is affected by uplink transmission of the UE 15.

When the UE 16 receives interference from the UE 15, the UE 16 needs to measure channel quality, and reports CSI to the micro base station 12. However, in the three current CSI measurement and reporting solutions, if the wideband CSI solution is used, because the UE 16 receives interference only on the frequency band in the region 26, and wideband CSI reflects channel quality of an entire downlink frequency band in the region 22, average CSI of the entire frequency band may be reported to the micro base station 12 in the wideband CSI solution, which cannot reflect a status of interference to the UE 16. If the optimal M-subband CSI solution is used, the UE 16 measures only CSI of M subbands with relatively good channel conditions on another frequency band in the region 22 except for the region 26, and reports the CSI to the micro base station 12, which cannot reflect a status of interference to the UE 16, either. If the subband CSI solution is used, the UE 16 measures CSI of each subband in the region 22 and reports the CSI to the micro base station 12. Although this solution can reflect a status of interference to the UE 16, a relatively large quantity of resources need to be occupied to report the CSI of each subband.

In view of the foregoing problems of the existing CSI measurement and feedback methods, the embodiments of the present invention provide a channel quality reporting method and an apparatus, which can measure and report a status of interference to UE by using a relatively small quantity of resources.

Figure 3A:
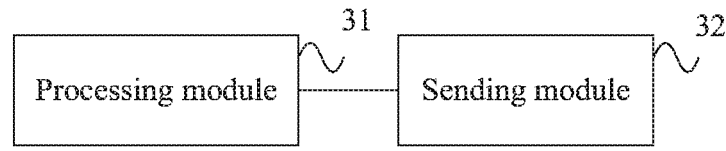
FIG. 3A is a schematic structural diagram of a first embodiment of user equipment provided in the embodiments of the present invention.

FIG. 3A is a schematic structural diagram of a first embodiment of user equipment provided in the embodiments of the present invention. As shown in FIG. 3A, the user equipment in this embodiment includes a processing module 31 and a sending module 32.

The processing module 31 is configured to: perform channel state measurement on a first frequency resource of a first carrier to obtain first CSI; and perform channel state measurement on a second frequency resource of the first carrier to obtain second CSI, where the first frequency resource and the second frequency resource do not overlap, resource blocks in the first frequency resource are consecutive, resource blocks in the second frequency resource are consecutive, and the second frequency resource includes an edge resource block of the first carrier.

Specifically, in order that a relatively small quantity of resources are used to measure and report a status of interference to the user equipment, in this embodiment, the first carrier used by the user equipment for communication is first divided. The first carrier is divided into the first frequency resource and the second frequency resource. The first frequency resource and the second frequency resource each include multiple resource blocks (RB). The resource blocks in the first frequency resource are consecutive, and the resource blocks in the second frequency resource are consecutive. A resource block herein is a smallest frequency resource unit for data transmission by the user equipment. The first frequency resource and the second frequency resource do not overlap, and the second frequency resource includes at least an edge resource block of the first carrier, where the edge resource block indicates a resource block on an edge of the first carrier.

When measuring a channel state, the processing module 31 in the user equipment provided in this embodiment separately measures channel states of the first frequency resource and the second frequency resource. Channel state measurement is performed on the first frequency resource of the first carrier to obtain the first CSI, and channel state measurement is performed on the second frequency resource of the first carrier to obtain the second CSI. A method for performing channel state measurement on the first frequency resource and the second frequency resource may be any CSI measurement and calculation solution.

The sending module 32 is configured to report information about the first CSI and information about the second CSI to a second communications device.

Specifically, after the processing module 31 obtains the first CSI and the second CSI, two processing methods are available to the user equipment provided in this embodiment.

In a first method, the sending module 32 directly reports the first CSI to the second communications device, and reports the second CSI to the second communications device. The second communications device is a network side device in a network. The second communications device can receive CSI reported by the user equipment. Generally, the second communications device is a base station in the network. After receiving the first CSI and the second CSI, the second communications device may respectively determine, according to the first CSI and the second CSI, whether the user equipment receives interference on the first frequency resource and the second frequency resource of the first carrier. The user equipment separately performs channel state measurement on the first frequency resource and the second frequency resource of the first carrier. Therefore, compared with CSI obtained by using the wideband CSI solution or the optimal M-subband CSI solution, the first CSI and the second CSI obtained by means of measurement by using this method can reflect a channel state of the first carrier more accurately. In comparison with a subband CSI solution, in this method, the user equipment has an independent reporting capability, and can measure and report channel state information without being triggered by signaling sent by the base station.

In a second method, the processing module 31 determines first interference information on the first carrier according to the first CSI and the second CSI, and the sending module 32 reports the first interference information to the second communications device. A difference between the second method and the foregoing first method lies in that, in the first method, the processing module 31 measures only the first frequency resource and the second frequency resource of the first carrier to obtain the first CSI and the second CSI respectively; and in the second method, after obtaining the first CSI and the second CSI, the processing module 31 further determines the first interference information on the first carrier according to the first CSI and the second CSI. That is, in the second method, whether the user equipment receives interference on the first carrier is determined by the processing module 31 provided in the user equipment. However, in the first method, the determining process is completed by the second communications device. After the processing module 31 determines the first interference information on the first carrier, the sending module 32 only needs to send the first interference information to the second communications device, and the second communications device may determine whether the user equipment receives interference on the first carrier. In this method, only the first interference information is reported to the second communications device, and the first interference information is used to represent only the status of interference to the user equipment on the first carrier. Therefore, reporting the channel state information by the user equipment by using this method can reduce radio resources used.

In an implementation manner of the embodiment shown in FIG. 3A, the information about the first CSI includes the first CSI, and the information about the second CSI includes the second CSI; and the sending module 32 is specifically configured to report the information about the first CSI and the information about the second CSI to the second communications device in the following manner: reporting the first CSI to the second communications device, and reporting the second CSI to the second communications device.

Specifically, after the processing module 31 obtains the first CSI and the second CSI, the sending module 32 reports the first CSI and the second CSI to the second communications device together or separately. The second communications device is a network side device in the network. The second communications device can receive CSI reported by the user equipment. Generally, the second communications device is a base station in the network.

After receiving the first CSI and the second CSI, the second communications device may respectively determine, according to the first CSI and the second CSI, whether the user equipment receives interference on the first frequency resource and the second frequency resource of the first carrier. The user equipment separately performs channel state measurement on the first frequency resource and the second frequency resource of the first carrier. Therefore, compared with the CSI obtained by using the wideband CSI solution or the optimal M-subband CSI solution, the first CSI and the second CSI obtained by means of measurement by using this method can reflect the channel state of the first carrier more accurately. In comparison with the subband CSI solution, in this method, the user equipment has an independent reporting capability, and can measure and report channel state information without being triggered by signaling sent by the base station.

Further, in the embodiment shown in FIG. 3A, the first CSI is average channel state information corresponding to the first frequency resource, and the second CSI is average channel state information corresponding to the second frequency resource.

Specifically, when the first CSI is the average channel state information corresponding to the first frequency resource, and the second CSI is the average channel state information corresponding to the second frequency resource, for the first frequency resource, the first CSI is similar to CSI measured by using the wideband CSI solution, and for the second frequency resource, the second CSI is similar to the CSI measured by using the wideband CSI solution. Therefore, according to the user equipment in this embodiment, not only a channel state is accurately reflected, but also resources used for measuring and reporting channel state information are reduced.

Further, frequency resources that can be used by different operators or different wireless communications systems are pre-allocated. Therefore, when the first carrier is allocated to the user equipment for communication, frequency bands that are of the first carrier and on which there may be adjacent-channel interference from another operator or another wireless communications system may be learned. To resolve the problem of adjacent-channel interference in the heterogeneous network shown in FIG. 1 and FIG. 2, in this embodiment, the following may be further set: The second frequency resource is a frequency resource that is of the first carrier and that is subject to potential interference, and the first frequency resource is a frequency resource that is of the first carrier and that is subject to no potential interference. The frequency resource that is subject to potential interference is a frequency band that is of the first carrier and on which there may be adjacent-channel interference from another operator or another wireless communications system, and the frequency resource that is subject to no potential interference is a frequency band that is of the first carrier and on which there is no adjacent-channel interference from another operator or another wireless communications system.

Whether the first frequency resource and the second frequency resource are frequency resources that is subject to potential interference may be determined according to spectrum allocation in a wireless communications system. Generally, frequency resources that is subject to potential interference are some edge frequency resources of the first carrier. There may be interference on these edge frequency resources of the first carrier from a different operator or a different system that uses an adjacent frequency. As shown in FIG. 1 and FIG. 2, it is assumed that the UE 16 is user equipment to which there may be adjacent-channel interference, a frequency resource in the region 22 is the first carrier, a frequency resource in the region 26 is the second frequency resource, and a frequency resource in another region than the region 26 in the region 22 is the first frequency resource. If the UE 16 separately measures and reports channel state information of the frequency resource in the region 26 and the frequency resource in the another region than the region 26 in the region 22, an interference status can be reflected quite accurately.

In this embodiment, a first frequency resource and a second frequency resource of a first carrier are measured to obtain first CSI and second CSI respectively, and information about the first CSI and information about the second CSI are reported to a second communications device, where the first frequency resource and the second frequency resource do not overlap, and the second frequency resource includes at least an edge resource block of the first carrier, so that user equipment can independently and accurately measure and report a channel state.

Further, in the embodiment shown in FIG. 3A, the processing module 31 is further configured to: before performing channel state measurement on the first frequency resource of the first carrier to obtain the first CSI, obtain frequency band information of the first frequency resource; and before performing channel state measurement on the second frequency resource of the first carrier to obtain the second CSI, obtain frequency band information of the second frequency resource.

Specifically, the processing module 31 needs to separately perform channel state measurement on the first frequency resource and the second frequency resource of the first carrier. Therefore, before performing measurement, the processing module 31 needs to first obtain the frequency band information of the first frequency resource and the frequency band information of the second frequency resource. Optionally, the frequency band information of the first frequency resource and the frequency band information of the second frequency resource may be preset in a storage module in the user equipment. In this case, the processing module 31 may determine the first frequency resource and the second frequency resource according to the frequency band information of the first frequency resource and the frequency band information of the second frequency resource that are preset in the user equipment. Alternatively, the frequency band information of the first frequency resource and the frequency band information of the second frequency resource may be preset in a storage module in the second communications device. In this case, the processing module 31 may obtain the frequency band information of the first frequency resource and the frequency band information of the second frequency resource from notification information sent by the second communications device. Therefore, further, the user equipment in the embodiment shown in FIG. 3A may further include a receiving module, configured to receive the notification information sent by the second communications device.

Figure 3B:
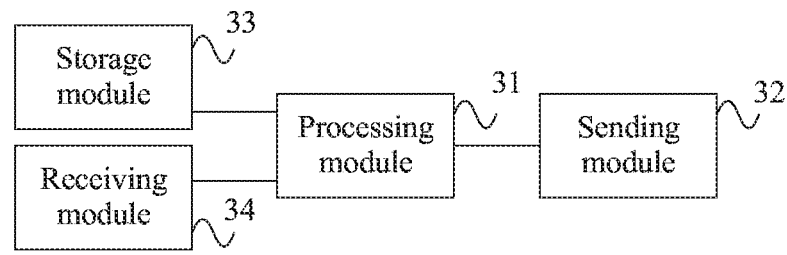
FIG. 3B is a schematic structural diagram of a second embodiment of the user equipment provided in the embodiments of the present invention.

FIG. 3B is a schematic structural diagram of a second embodiment of the user equipment provided in the embodiments of the present invention. As shown in FIG. 3B, based on FIG. 3A, the user equipment in this embodiment further includes a storage module 33 or a receiving module 34.

The storage module 33 is configured to store the frequency band information of the first frequency resource and the frequency band information of the second frequency resource.

The receiving module 34 is configured to receive the notification information sent by the second communications device, where the notification message includes the frequency band information of the first frequency resource and the frequency band information of the second frequency resource.

The frequency band information of the first frequency resource includes information used to indicate a location and/or bandwidth of the first frequency resource, and the frequency band information of the second frequency resource includes information used to indicate a location and/or bandwidth of the second frequency resource.

Further, in the embodiment shown in FIG. 3A or FIG. 3B, the processing module 31 is specifically configured to: periodically perform channel state measurement on the first frequency resource to obtain the first CSI; and periodically perform channel state measurement on the second frequency resource to obtain the second CSI. The sending module 32 is specifically configured to: periodically report the first CSI to the second communications device; and periodically report the second CSI to the second communications device.

Further, in the embodiment shown in FIG. 3A or FIG. 3B, the processing module 31 is further configured to perform channel state measurement on a third frequency resource of the first carrier to obtain third CSI, where the third CSI is channel state information corresponding to the third frequency resource of the first carrier, the first frequency resource, the second frequency resource, and the third frequency resource do not overlap with each other, and the third frequency resource includes at least an edge resource block of the first carrier; and the sending module 32 is further configured to report the third CSI to the second communications device.

Specifically, in a scenario of the heterogeneous network architecture shown in FIG. 1 and FIG. 2, only adjacent-channel interference from the UE 15 to the UE 16 is shown. The UE 15 causes interference to some frequency bands on one side of an entire frequency band of the UE 16. However, in another scenario that is not shown, the UE 16 may receive interference on both sides of the entire frequency band.

Figure 4:
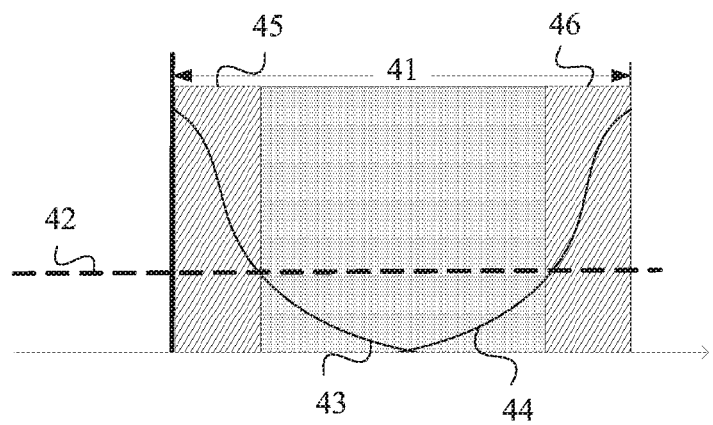
FIG. 4 is a schematic diagram showing that a first communications device receives interference on both sides of an entire frequency band.

As shown in FIG. 4, FIG. 4 is a schematic diagram showing that user equipment receives interference on both sides of an entire frequency band. In FIG. 4, a horizontal axis represents frequency, and a vertical axis represents amplitude. A region 41 on the horizontal axis is a downlink transmission frequency band of a first communications device, and a dashed line 42 is an interference tolerance threshold of the first communications device. Interference above the dashed line 42 may affect downlink transmission of the first communications device. A curve 43 is a spectrum waveform of an uplink transmission signal of a third communications device; and a curve 44 is a spectrum waveform of an uplink transmission signal of a fourth communications device. It may be seen from FIG. 4 that both the third communications device and the fourth communications device may affect downlink transmission of the first communications device. Downlink transmission of the first communications device is affected on a frequency band, in a region 45, of the curve 43, and the first communications device receives interference on a frequency band, in a region 46, of the curve 44. The first communications device is user equipment that may receive interference from other user equipment, and the third communications device and the fourth communications device are user equipments that may cause interference to the first communications device.

In the foregoing case, if the processing module 31 performs channel state measurement only on the first frequency resource and the second frequency resource of the first carrier, the second communications device that receives the channel state information learns only that the first communications device receives interference on the second frequency resource, that is, learns only that the first communications device receives interference on some frequency bands on one side. If the second communications device schedules the first communications device away from the second frequency resource by using a frequency scheduling method, the first communications device may still receive interference on a frequency resource on the other side.

Therefore, the processing module 31 may further perform channel state measurement on the third frequency resource of the first carrier to obtain the third CSI, where the third CSI is the channel state information corresponding to the third frequency resource of the first carrier, the first frequency resource, the second frequency resource, and the third frequency resource do not overlap with each other, and the third frequency resource includes at least an edge resource block of the first carrier. Herein, equivalently, the first carrier is divided into three parts that are respectively the first frequency resource, the second frequency resource, and the third frequency resource. The second frequency resource and the third frequency resource each include at least an edge resource block of the first carrier. That is, the second frequency resource and the third frequency resource are respectively some frequency resources on the two sides of the first carrier. In this way, the processing module 31 measures the first carrier to separately obtain the first CSI, the second CSI, and the third CSI, which can reflect channel state information of the first communications device on the first frequency resource more accurately. A method for performing channel state measurement on the third frequency resource may be any CSI measurement and calculation solution.

After the processing module 31 obtains the first CSI, the second CSI, and the third CSI, the sending module 32 reports the first CSI, the second CSI, and the third CSI to the second communications device together or separately. After receiving the first CSI, the second CSI, and the third CSI, the second communications device may respectively determine, according to the first CSI, the second CSI, and the third CSI, whether the user equipment receives interference on the first frequency resource, the second frequency resource, and the third frequency resource of the first carrier. The user equipment separately performs channel state measurement on the first frequency resource, the second frequency resource, and the third frequency resource of the first carrier. Therefore, compared with the CSI obtained by using the wideband CSI solution or the optimal M-subband CSI solution, the first CSI, the second CSI, and the third CSI obtained by means of measurement by using this method can reflect the channel state of the first carrier more accurately. In comparison with the subband CSI solution, in this method, the user equipment has an independent reporting capability, and can measure and report channel state information without being triggered by signaling sent by the base station.

Further, in the embodiment shown in FIG. 3A or FIG. 3B, the third CSI is average channel state information corresponding to the third frequency resource.

Specifically, when the third CSI is the average channel state information corresponding to the third frequency resource, for the third frequency resource, the third CSI is similar to the CSI measured by using the wideband CSI solution. Therefore, according to the user equipment in this embodiment, not only a channel state is accurately reflected, but also resources used for measuring and reporting channel state information are reduced.

Further, frequency resources that can be used by different operators or different wireless communications systems are pre-allocated. Therefore, when the first carrier is allocated to the user equipment for communication, frequency bands that are of the first carrier and on which there may be adjacent-channel interference from another operator or another wireless communications system may be learned. To resolve the problem of adjacent-channel interference shown in FIG. 4, in this embodiment, the following may be further set: The second frequency resource and the third frequency resource are frequency resources that are of the first carrier and that is subject to potential interference, and the first frequency resource is a frequency resource that is of the first carrier and that is subject to no potential interference.

Whether the first frequency resource, the second frequency resource, and the third frequency resource are frequency resources that is subject to potential interference may be determined according to spectrum allocation in the wireless communications system. Generally, frequency resources that is subject to potential interference are some edge frequency resources of the first carrier. There may be interference on these edge frequency resources of the first carrier from a different operator or a different system that uses an adjacent frequency. As shown in FIG. 4, a frequency resource in the region 41 is the first carrier, a frequency resource in the region 45 is the second frequency resource, a frequency resource in the region 46 is the third frequency resource, and a frequency resource in another region than the region 45 and the region 46 in the region 41 is the first frequency resource. If channel state information of the frequency resource in the region 45, the frequency resource in the region 46, and the frequency resource in the another region than the region 45 and the region 46 in the region 41 is separately measured and reported, an interference status can be reflected quite accurately.

Further, in the embodiment shown in FIG. 3A or FIG. 3B, the processing module 31 is further configured to: before performing channel state measurement on the third frequency resource of the first carrier to obtain the third CSI, obtain frequency band information of the third frequency resource.

Further, in the embodiment shown in FIG. 3A or FIG. 3B, the processing module 31 is specifically configured to obtain the frequency band information of the third frequency resource from preset information, or obtain the frequency band information of the third frequency resource from notification information sent by the second communications device. The processing module 31 obtains the frequency band information of the third frequency resource from the storage module 33; or the receiving module 34 receives notification information sent by the second communications device, and the processing module 31 obtains the frequency band information of the third frequency resource from the notification information sent by the second communications device.

The frequency band information of the third frequency resource includes information used to indicate a location and/or bandwidth of the third frequency resource.

Further, in the embodiment shown in FIG. 3A or FIG. 3B, the processing module 31 is specifically configured to periodically perform channel state measurement on the third frequency resource to obtain the third CSI; and the sending module 32 is specifically configured to periodically report the third CSI to the second communications device.

Specific methods for measuring the third frequency resource by the processing module 31 and reporting the third CSI by the sending module 32 are the same as those for measuring the second frequency resource and reporting the second CSI, and details are not described herein again.

Figure 5:
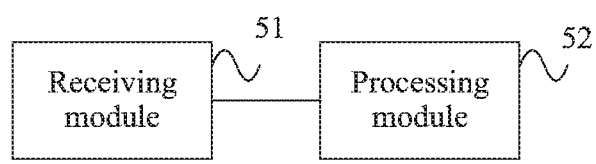
FIG. 5 is a schematic structural diagram of a first embodiment of a network device provided in the embodiments of the present invention.

FIG. 5 is a schematic structural diagram of a first embodiment of a network device provided in the embodiments of the present invention. As shown in FIG. 5, the network device in this embodiment includes a receiving module 51 and a processing module 52.

The receiving module 51 is configured to receive information about first CSI and information about second CSI that are reported by a first communications device, where the information about the first CSI is information about channel state information corresponding to a first frequency resource of a first carrier, the information about the second CSI is information about channel state information corresponding to a second frequency resource of the first carrier, the first frequency resource and the second frequency resource do not overlap, resource blocks in the first frequency resource are consecutive, resource blocks in the second frequency resource are consecutive, and the second frequency resource includes an edge resource block of the first carrier.

Specifically, the network device provided in this embodiment can receive CSI reported by the first communications device. Generally, the network device is a base station in a network. The first communications device is a communications device receiving interference from another communications device, and the first communications device may be, for example, UE.

In order that a relatively small quantity of resources are used to measure and report a status of interference to the first communications device, in this embodiment, the first carrier used by the first communications device for communication is first divided. The first carrier is divided into the first frequency resource and the second frequency resource. The first frequency resource and the second frequency resource each include multiple resource blocks. The resource blocks in the first frequency resource are consecutive, and the resource blocks in the second frequency resource are consecutive. A resource block herein is a smallest frequency resource unit for data transmission by the first communications device. The first frequency resource and the second frequency resource do not overlap, and the second frequency resource includes at least an edge resource block of the first carrier, where the edge resource block represents a resource block on an edge of the first carrier.

The receiving module 51 in the network device provided in this embodiment separately receives the information about the first CSI and the information about the second CSI that are reported by the first communications device. The information about the first CSI is the information about the channel state information corresponding to the first frequency resource of the first carrier, and the information about the second CSI is the information about the channel state information corresponding to the second frequency resource of the first carrier.

In this embodiment, two cases exist for the information about the first CSI and the information about the second CSI. In a first case, the information about the first CSI includes the first CSI, and the information about the second CSI includes the second CSI. After the first communications device obtains the first CSI and the second CSI by means of measurement, the receiving module 51 separately receives the first CSI and the second CSI that are reported by the first communications device. In a second case, the information about the first CSI and the information about the second CSI include first interference information. The first interference information is obtained by the first communications device according to the first CSI and the second CSI after the first communications device obtains the first CSI and the second CSI by means of measurement. The receiving module 51 directly receives the first interference information.

The processing module 52 is configured to determine information about interference to the first communications device on the first carrier according to the information about the first CSI and the information about the second CSI.

Specifically, after the receiving module 51 receives the information about the first CSI and the information about the second CSI, the processing module 52 may determine the information about interference to the first communications device on the first carrier according to the information about the first CSI and the information about the second CSI. If the information about the first CSI includes the first CSI, and the information about the second CSI includes the second CSI, the processing module 52 determines, according to the first CSI and the second CSI respectively, whether user equipment receives interference on the first frequency resource and the second frequency resource of the first carrier. The first communications device separately performs channel state measurement on the first frequency resource and the second frequency resource of the first carrier and performs reporting. Therefore, compared with CSI obtained by using the wideband CSI solution or the optimal M-subband CSI solution, the first CSI and the second CSI obtained by the network device according to this method can reflect a channel state of the first carrier more accurately. In comparison with the subband CSI solution, in this method, the first communications device has an independent reporting capability, and can measure and report channel state information without being triggered by signaling sent by the base station.

If the information about the first CSI and the information about the second CSI include the first interference information, whether the first communications device receives interference on the first carrier is determined by the first communications device. The first interference information received by the network device directly represents information about a status of interference to the first communications device on the first carrier. Therefore, reporting the channel state information by the user equipment by using this method can reduce radio resources used.

In an implementation manner of the embodiment shown in FIG. 5, the information about the first CSI includes the first CSI, and the information about the second CSI includes the second CSI. The receiving module 51 is specifically configured to receive, in the following manner, the information about the first CSI and the information about the second CSI that are reported by the first communications device: receiving the first CSI reported by the first communications device, and receiving the second CSI reported by the first communications device. The processing module 52 is specifically configured to determine the information about interference to the first communications device on the first carrier according to the first CSI and the second CSI.

Specifically, the receiving module 51 separately receives the first CSI and the second CSI, and the processing module 52 determines, according to the first CSI and the second CSI respectively, whether the first communications device receives interference on the first frequency resource and the second frequency resource of the first carrier. The network device provided in this embodiment separately receives the first CSI and the second CSI that are reported by the first communications device that has measured the first frequency resource and the second frequency resource of the first carrier. Therefore, compared with the CSI obtained by using the wideband CSI solution or the optimal M-subband CSI solution, the first CSI and the second CSI obtained by using this method can reflect the channel state of the first carrier more accurately. In comparison with the subband CSI solution, in this method, the first communications device has an independent reporting capability, and can measure and report channel state information without being triggered by signaling sent by the base station.

Further, in the embodiment shown in FIG. 5, the first CSI is average channel state information corresponding to the first frequency resource, and the second CSI is average channel state information corresponding to the second frequency resource.

Specifically, when the first CSI is the average channel state information corresponding to the first frequency resource, and the second CSI is the average channel state information corresponding to the second frequency resource, for the first frequency resource, the first CSI is similar to CSI measured by using the wideband CSI solution, and for the second frequency resource, the second CSI is similar to the CSI measured by using the wideband CSI solution. Therefore, according to the network device in this embodiment, not only a channel state is accurately reflected, but also resources used for measuring and reporting channel state information are reduced.

Further, frequency resources that can be used by different operators or different wireless communications systems are pre-allocated. Therefore, when the first carrier is allocated to the first communications device for communication, frequency bands that are of the first carrier and on which there may be adjacent-channel interference from another operator or another wireless communications system may be learned. To resolve the problem of adjacent-channel interference in the heterogeneous network shown in FIG. 1 and FIG. 2, in this embodiment, the following may be further set: The second frequency resource is a frequency resource that is of the first carrier and that is subject to potential interference, and the first frequency resource is a frequency resource that is of the first carrier and that is subject to no potential interference. The frequency resource that is subject to potential interference is a frequency band that is of the first carrier and on which there may be adjacent-channel interference from another operator or another wireless communications system, and the frequency resource that is subject to no potential interference is a frequency band that is of the first carrier and on which there is no adjacent-channel interference from another operator or another wireless communications system.

Whether the first frequency resource and the second frequency resource are frequency resources that is subject to potential interference may be determined according to spectrum allocation in a wireless communications system. Generally, frequency resources that is subject to potential interference are some edge frequency resources of the first carrier. There may be interference on these edge frequency resources of the first carrier from a different operator or a different system that uses an adjacent frequency.

In this embodiment, channel state information reported by a first communications device that has measured a first frequency resource and a second frequency resource of a first carrier is received, where the first frequency resource and the second frequency resource do not overlap, and the second frequency resource includes at least an edge resource block of the first carrier. In this way, a network device can receive channel state information that is independently and accurately measured and reported by user equipment.

Figure 6:
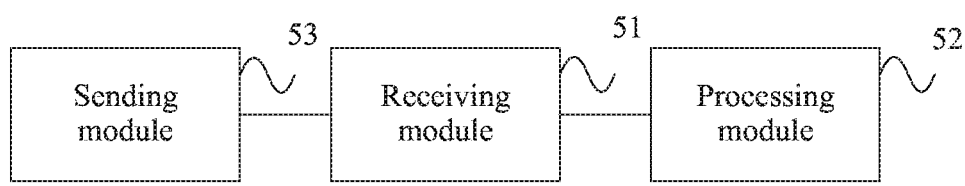
FIG. 6 is a schematic structural diagram of a second embodiment of the network device provided in the embodiments of the present invention.

FIG. 6 is a schematic structural diagram of a second embodiment of the network device provided in the embodiments of the present invention. As shown in FIG. 6, based on FIG. 5, the network device in this embodiment further includes: a sending module 53, configured to: before the receiving module 51 receives the first CSI reported by the first communications device, send a notification message to the first communications device, where the notification message includes frequency band information of the first frequency resource; and before the receiving module 51 receives the second CSI reported by the first communications device, send a notification message to the first communications device, where the notification message includes frequency band information of the second frequency resource.

Specifically, the first communications device needs to separately perform channel state measurement on the first frequency resource and the second frequency resource of the first carrier. Therefore, before performing measurement, the first communications device needs to first obtain the frequency band information of the first frequency resource and the frequency band information of the second frequency resource. Optionally, the frequency band information of the first frequency resource and the frequency band information of the second frequency resource may be preset in a storage module in the first communications device. In this case, the first communications device may determine the first frequency resource and the second frequency resource according to the preset frequency band information of the first frequency resource and the preset frequency band information of the second frequency resource. Alternatively, the frequency band information of the first frequency resource and the frequency band information of the second frequency resource may be preset in a storage module in the network device. Therefore, the first communications device may obtain the frequency band information of the first frequency resource and the frequency band information of the second frequency resource from preset information of the network device. Alternatively, the first communications device may obtain the frequency band information of the first frequency resource and the frequency band information of the second frequency resource from notification information sent by a second communications device.

If the frequency band information of the first frequency resource and the frequency band information of the second frequency resource are preset in the second communications device, in the network device provided in this embodiment, the sending module 53 is configured to: before the receiving module 51 receives the first CSI reported by the first communications device, send the notification message to the first communications device, where the notification message includes the frequency band information of the first frequency resource; and before the receiving module 51 receives the second CSI reported by the first communications device, send the notification message to the first communications device, where the notification message includes the frequency band information of the second frequency resource.

The frequency band information of the first frequency resource includes information used to indicate a location and/or bandwidth of the first frequency resource, and the frequency band information of the second frequency resource includes information used to indicate a location and/or bandwidth of the second frequency resource.

Further, in the embodiment shown in FIG. 5 or FIG. 6, the receiving module 51 is specifically configured to: receive the first CSI periodically reported by the first communications device, and receive the second CSI periodically reported by the first communications device.

Further, in the embodiment shown in FIG. 5 or FIG. 6, the processing module 52 is specifically configured to: if a difference between the first CSI and the second CSI is greater than a preset threshold, determine that the first communications device receives interference on the second frequency resource of the first carrier; or if N pieces of second CSI received consecutively by the receiving module 51 are lower than historical average second CSI received by the receiving module 51, determine that the first communications device receives interference on the second frequency resource of the first carrier, where N is a preset positive integer, and N≥2.

Specifically, after the receiving module 51 receives the first CSI and the second CSI, a specific method for determining, by the processing module 52 according to the first CSI and the second CSI, whether the first communications device receives interference may be: if the difference between the first CSI and the second CSI is greater than the preset threshold, determining that the first communications device receives interference on the second frequency resource. That is, if channel quality of the second frequency resource is far lower than channel quality of the first frequency resource, the processing module 52 may determine that the first communications device receives interference on the second frequency resource.

Alternatively, if the N pieces of second CSI consecutively received by the receiving module 51 are lower than the historical average second CSI received by the receiving module 51, the processing module 52 determines that the first communications device receives interference on the second frequency resource of the first carrier, where N is a preset positive integer, and N 2. The receiving module 51 may periodically receive the first CSI and the second CSI. Therefore, after the receiving module 51 receives multiple pieces of second CSI sent by the first communications device, the processing module 52 may obtain the historical average second CSI of the first communications device through calculation. If the N pieces of second CSI consecutively received by the receiving module 51 are all lower than the historical average second CSI received by the receiving module 51, the processing module 52 may determine that the first communications device receives interference on the second frequency resource. A value of N is determined according to a system configuration.

Further, in the embodiment shown in FIG. 5, the receiving module 51 is further configured to receive third CSI reported by the first communications device, where the third CSI is channel state information corresponding to a third frequency resource of the first carrier, the first frequency resource, the second frequency resource, and the third frequency resource do not overlap with each other, and the third frequency resource includes at least an edge resource block of the first carrier; and the processing module 52 is further configured to determine the information about interference to the first communications device on the first carrier according to the first CSI and the third CSI.

Specifically, if interference to the first communications device is similar to interference shown in FIG. 4, that is, the first communications device receives interference on both sides of the first carrier, if the receiving module 51 receives only the first CSI and the second CSI that are reported by the first communications device, the processing module 52 determines only that the first communications device receives interference on the second frequency resource, that is, determines only that the first communications device receives interference on some frequency bands on one side.

Therefore, the receiving module 51 may further receive the third CSI reported by the first communications device, where the third CSI is the channel state information corresponding to the third frequency resource of the first carrier, the first frequency resource, the second frequency resource, and the third frequency resource do not overlap with each other, and the third frequency resource includes at least an edge resource block of the first carrier. Herein, equivalently, the first carrier is divided into three parts that are respectively the first frequency resource, the second frequency resource, and the third frequency resource. The second frequency resource and the third frequency resource each include at least an edge resource block of the first carrier. That is, the second frequency resource and the third frequency resource are respectively some frequency resources on the two sides of the first carrier. In this way, the first CSI, the second CSI, and the third CSI that are separately received by the receiving module 51 can reflect channel state information of the first communications device on the first frequency resource more accurately.

After the receiving module 51 receives the first CSI, the second CSI, and the third CSI, the processing module 52 determines the information about interference to the first communications device on the first carrier according to the first CSI, the second CSI, and the third CSI. The network device separately receives the first CSI, the second CSI, and the third CSI that are obtained by the user equipment by performing channel state measurement on the first frequency resource, the second frequency resource, and the third frequency resource of the first carrier. Therefore, compared with the CSI obtained by using the wideband CSI solution or the optimal M-subband CSI solution, the first CSI, the second CSI, and the third CSI obtained by using this method can reflect the channel state of the first carrier more accurately. In comparison with the subband CSI solution, in this method, the first communications device has an independent reporting capability, and can measure and report channel state information without being triggered by signaling sent by the base station.

Further, in the embodiment shown in FIG. 5, the third CSI is average channel state information corresponding to the third frequency resource.

Specifically, when the third CSI is the average channel state information corresponding to the third frequency resource, for the third frequency resource, the third CSI is similar to the CSI measured by using the wideband CSI solution. Therefore, according to the network device in this embodiment, not only a channel state is accurately reflected, but also resources used for measuring and reporting channel state information are reduced.

Further, frequency resources that can be used by different operators or different wireless communications systems are pre-allocated. Therefore, when the first carrier is allocated to the first communications device for communication, frequency bands that are of the first carrier and on which there may be adjacent-channel interference from another operator or another wireless communications system may be learned. To resolve the problem of adjacent-channel interference shown in FIG. 4, in this embodiment, the following may be further set: The second frequency resource and the third frequency resource are frequency resources that are of the first carrier and that is subject to potential interference, and the first frequency resource is a frequency resource that is of the first carrier and that is subject to no potential interference.

Whether the first frequency resource, the second frequency resource, and the third frequency resource are frequency resources that is subject to potential interference may be determined according to spectrum allocation in a wireless communications system. Generally, frequency resources that is subject to potential interference are some edge frequency resources of the first carrier. There may be interference on these edge frequency resources of the first carrier from a different operator or a different system that uses an adjacent frequency.

Further, in the embodiment shown in FIG. 6, the sending module 53 is further configured to: before the receiving module receives the third CSI reported by the first communications device, send a notification message to the first communications device, where the notification message includes frequency band information of the third frequency resource.

The frequency band information of the third frequency resource includes information used to indicate a location and/or bandwidth of the third frequency resource.

Further, in the embodiment shown in FIG. 5 or FIG. 6, the receiving module 51 is specifically configured to receive the third CSI periodically reported by the first communications device.

Further, in the embodiment shown in FIG. 5 or FIG. 6, the processing module 52 is specifically configured to: if a difference between the first CSI and the third CSI is greater than a preset threshold, determine that the first communications device receives interference on the third frequency resource of the first carrier; or if M pieces of third CSI received consecutively by the receiving module are lower than historical average third CSI received by the receiving module, determine that the first communications device receives interference on the third frequency resource of the first carrier, where M is a preset positive integer, and M≥2.

Specific methods for measuring the third frequency resource and reporting the third CSI by the receiving module 51, the processing module 52, and the sending module 53 are the same as those for measuring the second frequency resource and reporting the second CSI, and details are not described herein again.

Figure 7A:
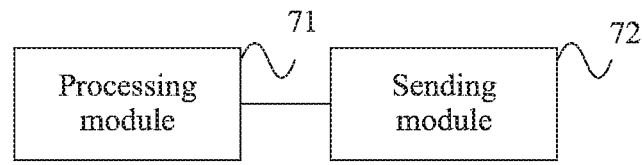
FIG. 7A is a schematic structural diagram of a third embodiment of the user equipment provided in the embodiments of the present invention.

FIG. 7A is a schematic structural diagram of a third embodiment of the user equipment provided in the embodiments of the present invention. As shown in FIG. 7A, the user equipment in this embodiment includes a processing module 71 and a sending module 72.

The processing module 71 is configured to: perform channel state measurement on a first frequency resource of a first carrier to obtain first CSI, where the first CSI is channel state information corresponding to the first frequency resource of the first carrier; perform channel state measurement on a second frequency resource of the first carrier to obtain second CSI, where the second CSI is channel state information corresponding to the second frequency resource of the first carrier, the first frequency resource and the second frequency resource do not overlap, resource blocks in the first frequency resource are consecutive, resource blocks in the second frequency resource are consecutive, and the second frequency resource includes an edge resource block of the first carrier; and determine first interference information on the first carrier according to the first CSI and the second CSI.

Specifically, the user equipment provided in this embodiment is a specific embodiment of another implementation manner of the embodiment shown in FIG. 3A. A difference from the foregoing implementation manner of the embodiment shown in FIG. 3A lies in that, in the foregoing implementation manner of the embodiment shown in FIG. 3A, the processing module 31 measures only the first frequency resource and the second frequency resource of the first carrier to separately obtain the first CSI and the second CSI; in this embodiment, after obtaining the first CSI and the second CSI, the processing module 71 further determines the first interference information on the first carrier according to the first CSI and the second CSI. That is, in this embodiment, whether the user equipment receives interference on the first carrier is determined by the processing module 71 provided in the user equipment. However, in the foregoing implementation manner of the embodiment shown in FIG. 3A, the determining process is completed by a second communications device.

The sending module 72 is configured to report the first interference information to the second communications device.

Specifically, after the processing module 71 determines the first interference information on the first carrier, the first interference information is reported to the second communications device. The second communications device is a network side device in a network. The second communications device can receive CSI reported by a first communications device. Generally, the second communications device is a base station in the network. After receiving the first interference information, the second communications device may learn whether the first communications device receives interference on the first carrier, without performing other processing.

In a process of measuring and reporting CSI, a resource occupied for reporting is a radio resource of an air interface. Radio resources are limited, and cannot be increased by using a technical means. However, a processing capability of the user equipment can be extended by using a technical means, so that the user equipment can determine, according to the first CSI and the second CSI after obtaining the first CSI and the second CSI by means of measurement, whether the first communications device receives interference on the first carrier, to obtain the first interference information. The first interference information may be indication information about whether the user equipment receives interference on the first carrier. In this way, the first interference information needs to occupy only a i-bit resource. Alternatively, the first interference information may be information about a degree of interference to the user equipment on the first carrier. The degree of interference to the user equipment is classified into multiple levels, and the first interference information occupying n-bit resources may represent a maximum of $2^n$ interference degree levels. Radio resources used by the user equipment to report the first CSI and the second CSI to the second communications device are far more than radio resources used to report the first interference information. Therefore, according to the user equipment provided in this embodiment, radio resources used to report channel state information can be reduced.

In this embodiment, a first frequency resource and a second frequency resource of a first carrier are measured to obtain first CSI and second CSI respectively; and first interference information on the first carrier is determined according to the first CSI and the second CSI, and the first interference information is reported to a second communications device, where the first frequency resource and the second frequency resource do not overlap, and the second frequency resource includes at least an edge resource block of the first carrier. In this way, a channel quality reporting apparatus can accurately measure and report a channel state by using a relatively small quantity of resources.

Further, in the embodiment shown in FIG. 7A, the second frequency resource is a frequency resource that is of the first carrier and that is subject to potential interference, and the first frequency resource is a frequency resource that is of the first carrier and that is subject to no potential interference.

Further, in the embodiment shown in FIG. 7A, the processing module 71 is specifically configured to: if a difference between the first CSI and the second CSI is greater than a preset threshold, determine that interference is received on the second frequency resource of the first carrier; or if N consecutive pieces of second CSI are lower than historical average second CSI measured by the processing module 71, determine that interference is received on the second frequency resource of the first carrier, where N is a preset positive integer, and N≥2; and the sending module 72 is specifically configured to report, to the second communications device, indication information about whether interference is received on the second frequency resource of the first carrier.

Specifically, a specific method for determining the first interference information by the processing module 71 is provided herein. A specific method for determining, by the processing module 71 according to the first CSI and the second CSI, whether the first communications device receives interference may be: if the difference between the first CSI and the second CSI is greater than the preset threshold, determining that the first communications device receives interference on the second frequency resource. That is, if channel quality of the second frequency resource is far lower than channel quality of the first frequency resource, the processing module 71 may determine that the first communications device receives interference on the second frequency resource. Alternatively, if the N consecutive pieces of second CSI measured by the processing module 71 are lower than the historical average second CSI measured by the processing module 71, the processing module 71 determines that interference is received on the second frequency resource of the first carrier, where N is a preset positive integer, and N≥2. Therefore, the processing module 71 determines that the first communications device receives interference on the second frequency resource of the first carrier, where N is a preset positive integer, and N≥2. The processing module 71 may periodically measure the first CSI and the second CSI. Therefore, after obtaining multiple pieces of second CSI by means of measurement, the processing module 71 may obtain the historical average second CSI of the first communications device through calculation. If the N pieces of second CSI consecutively measured by the processing module 71 are all lower than the historical average second CSI measured by the processing module 71, the processing module 71 may determine that the first communications device receives interference on the second frequency resource. A value of N is determined according to a system configuration.

Further, in the embodiment shown in FIG. 7A, the processing module 71 is specifically configured to determine a degree of interference received on the second frequency resource of the first carrier according to a difference range within which a difference between the first CSI and the second CSI falls; and the sending module 72 is specifically configured to report, to the second communications device, the degree of interference received on the second frequency resource of the first carrier.

Specifically, another specific method for determining the first interference information by the processing module 71 is further provided. The first CSI is the channel state information corresponding to the first frequency resource that is subject to no potential interference. Therefore, the first CSI is relatively stable, and a correspondence between multiple differences ranges of the first CSI and the second CSI and a degree of interference to the first communications device on the first carrier may be preset by using the first CSI as a reference. Then, the difference between the first CSI and the second CSI is calculated, and the degree of interference to the first communications device on the first carrier is determined according to the range within which the difference between the first CSI and the second CSI falls. After the processing module 71 determines the degree of interference received on the second frequency resource of the first carrier, the sending module 72 sends, to the second communications device, the degree of interference received on the second frequency resource of the first carrier. According to this measurement and reporting method, interference status information with a finer granularity can be reported to the second communications device.

Further, in the embodiment shown in FIG. 7A, the first CSI is average channel state information corresponding to the first frequency resource, and the second CSI is average channel state information corresponding to the second frequency resource.

Further, in the embodiment shown in FIG. 7A, the processing module 71 is further configured to: before performing channel state measurement on the first frequency resource of the first carrier to obtain the first CSI, obtain frequency band information of the first frequency resource; and before performing channel state measurement on the second frequency resource of the first carrier to obtain the second CSI, obtain frequency band information of the second frequency resource.

Specifically, the processing module 71 needs to separately perform channel state measurement on the first frequency resource and the second frequency resource of the first carrier. Therefore, before performing measurement, the processing module 71 needs to first obtain the frequency band information of the first frequency resource and the frequency band information of the second frequency resource. The frequency band information of the first frequency resource and the frequency band information of the second frequency resource may be preset in the first communications device, or the frequency band information of the first frequency resource and the frequency band information of the second frequency resource may be determined by the second communications device. Therefore, the processing module 71 may obtain the frequency band information of the first frequency resource and the frequency band information of the second frequency resource from preset information of the user equipment. Alternatively, the processing module 71 may obtain the frequency band information of the first frequency resource and the frequency band information of the second frequency resource from notification information sent by the second communications device.

The frequency band information of the first frequency resource includes information used to indicate a location and/or bandwidth of the first frequency resource, and the frequency band information of the second frequency resource includes information used to indicate a location and/or bandwidth of the second frequency resource.

Further, in the embodiment shown in FIG. 7A, the processing module 71 is specifically configured to: obtain the frequency band information of the first frequency resource from preset information, or obtain the frequency band information of the first frequency resource from notification information sent by the second communications device; and obtain the frequency band information of the second frequency resource from preset information, or obtain the frequency band information of the second frequency resource from notification information sent by the second communications device.

Figure 7B:
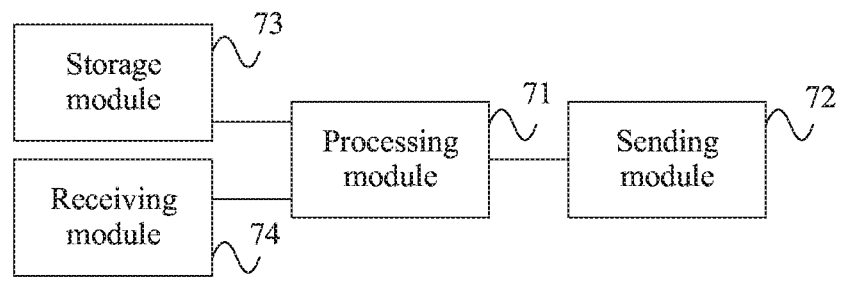
FIG. 7B is a schematic structural diagram of a fourth embodiment of the user equipment provided in the embodiments of the present invention.

FIG. 7B is a schematic structural diagram of a fourth embodiment of the user equipment provided in the embodiments of the present invention. As shown in FIG. 7B, based on FIG. 7A, the user equipment in this embodiment further includes a storage module 73 or a receiving module 74.

The storage module 73 is configured to store the frequency band information of the first frequency resource and the frequency band information of the second frequency resource.

The receiving module 74 is configured to receive the notification information sent by the second communications device, where the notification message includes the frequency band information of the first frequency resource and the frequency band information of the second frequency resource.

Further, in the embodiment shown in FIG. 7A or FIG. 7B, the frequency band information of the first frequency resource includes the information used to indicate the location and/or the bandwidth of the first frequency resource, and the frequency band information of the second frequency resource includes the information used to indicate the location and/or the bandwidth of the second frequency resource.

Further, in the embodiment shown in FIG. 7A or FIG. 7B, the processing module 71 is specifically configured to: periodically perform channel state measurement on the first frequency resource to obtain the first CSI; and periodically perform channel state measurement on the second frequency resource to obtain the second CSI. The sending module 72 is specifically configured to periodically report the first interference information to the second communications device; or report the first interference information to the second communications device by using a control channel or a data channel and by using a contention mechanism.

Further, in the embodiment shown in FIG. 7A or FIG. 7B, the processing module 71 is further configured to: perform channel state measurement on a third frequency resource of the first carrier to obtain third CSI, where the third CSI is channel state information corresponding to the third frequency resource of the first carrier, the first frequency resource, the second frequency resource, and the third frequency resource do not overlap with each other, and the third frequency resource includes at least an edge resource block of the first carrier; and determine second interference information on the first carrier according to the first CSI and the third CSI. The sending module 72 is further configured to report the second interference information to the second communications device.

Specifically, when the first communications device receives interference on both sides of the first carrier, if the processing module 71 performs channel state measurement only on the first frequency resource and the second frequency resource of the first carrier according to the first CSI and the second CSI, the processing module 71 can only determine that the user equipment receives interference on the second frequency resource, that is, can only determine that the first communications device receives interference on some frequency bands on one side. When the sending module 72 sends the interference information to the second communications device, if the second communications device schedules the first communications device away from the second frequency resource by using a frequency scheduling method, the first communications device may still receive interference on a frequency resource on the other side.

Therefore, the processing module 71 may further perform channel state measurement on the third frequency resource of the first carrier to obtain the third CSI, where the third CSI is the channel state information corresponding to the third frequency resource of the first carrier, the first frequency resource, the second frequency resource, and the third frequency resource do not overlap with each other, and the third frequency resource includes at least an edge resource block of the first carrier. Herein, equivalently, the first carrier is divided into three parts that are respectively the first frequency resource, the second frequency resource, and the third frequency resource. The second frequency resource and the third frequency resource each include at least an edge resource block of the first carrier. That is, the second frequency resource and the third frequency resource are respectively some frequency resources on the two sides of the first carrier. In this way, the processing module 71 measures the first carrier to separately obtain the first CSI, the second CSI, and the third CSI, which can reflect channel state information of the first communications device on the first frequency resource more accurately. A method for performing channel state measurement on the third frequency resource may be any CSI measurement and calculation solution.

A status of interference to the first communications device on the third frequency resource of the first carrier, that is, the second interference information, may be determined according to the first CSI and the third CSI. The sending module 72 reports the second interference information to the second communications device. After receiving the second interference information, the second communications device may determine the status of interference to the user equipment on the first carrier.

Further, in the embodiment shown in FIG. 7A or FIG. 7B, the third frequency resource is a frequency resource that is of the first carrier and that is subject to potential interference.

Further, in the embodiment shown in FIG. 7A or FIG. 7B, the processing module 71 is specifically configured to: if a difference between the first CSI and the third CSI is greater than a preset threshold, determine that interference is received on the third frequency resource of the first carrier; or if M consecutive pieces of third CSI are lower than historical average third CSI measured by the processing module, determine that interference is received on the third frequency resource of the first carrier, where M is a preset positive integer, and M≥2; and the sending module 72 is specifically configured to report, to the second communications device, indication information about whether interference is received on the third frequency resource of the first carrier.

Further, in the embodiment shown in FIG. 7A or FIG. 7B, the processing module 71 is specifically configured to determine a degree of interference received on the third frequency resource of the first carrier according to a difference range within which a difference between the first CSI and the third CSI falls; and the sending module 72 is specifically configured to report, to the second communications device, the degree of interference received on the third frequency resource of the first carrier.

Further, in the embodiment shown in FIG. 7A or FIG. 7B, the third CSI is average channel state information corresponding to the third frequency resource.

Further, in the embodiment shown in FIG. 7A or FIG. 7B, the processing module 71 is further configured to: before performing channel state measurement on the third frequency resource of the first carrier to obtain the third CSI, obtain frequency band information of the third frequency resource.

Further, in the embodiment shown in FIG. 7A or FIG. 7B, the processing module 71 is specifically configured to obtain the frequency band information of the third frequency resource from preset information, or obtain the frequency band information of the third frequency resource from notification information sent by the second communications device. The processing module 71 obtains the frequency band information of the third frequency resource from the storage module 73; or the receiving module 74 receives notification information sent by the second communications device, and the processing module 71 obtains the frequency band information of the third frequency resource from the notification information sent by the second communications device.

Further, in the embodiment shown in FIG. 7A or FIG. 7B, the frequency band information of the third frequency resource includes information used to indicate a location and/or bandwidth of the third frequency resource.

Further, in the embodiment shown in FIG. 7A or FIG. 7B, the processing module 71 is specifically configured to periodically perform channel state measurement on the third frequency resource to obtain the third CSI. The sending module 72 is specifically configured to periodically report the second interference information to the second communications device by using a pre-allocated resource; or report the second interference information to the second communications device by using a control channel or a data channel and by using a contention mechanism.

Specific methods for measuring the third frequency resource by the processing module 71 and reporting the third CSI and the second interference information by the sending module 72 are the same as those for measuring the second frequency resource and reporting the second CSI and the first interference information, and details are not described herein again.

If the user equipment in the embodiment shown in FIG. 7A or FIG. 7B is used as the first communications device to measure and report channel state information, accordingly, a network device that receives channel state information includes: a receiving module, configured to receive the first interference information reported by the first communications device, where the first interference information is determined by the first communications device according to the first CSI corresponding to the first frequency resource and the second CSI corresponding to the second frequency resource; and a processing module, specifically configured to determine information about interference to the first communications device on the first carrier according to the first interference information. The receiving module is further configured to receive the second interference information reported by the first communications device, where the second interference information is determined by the first communications device according to the first CSI corresponding to the first frequency resource and the third CSI corresponding to the third frequency resource; and the processing module is specifically configured to determine the information about interference to the first communications device on the first carrier according to the second interference information.

The user equipment and the network device provided in the embodiments shown in FIG. 3A to FIG. 7B are configured to cancel adjacent-channel interference between different systems or different operators, and a first communications device receiving interference receives interference only one some edge frequency bands of an entire carrier. However, in actual network operation, if a distance between two communications devices that use a same frequency is relatively short, an uplink transmission signal of one communications device may also cause interference to a downlink transmission signal of the other communications device.

Figure 8:
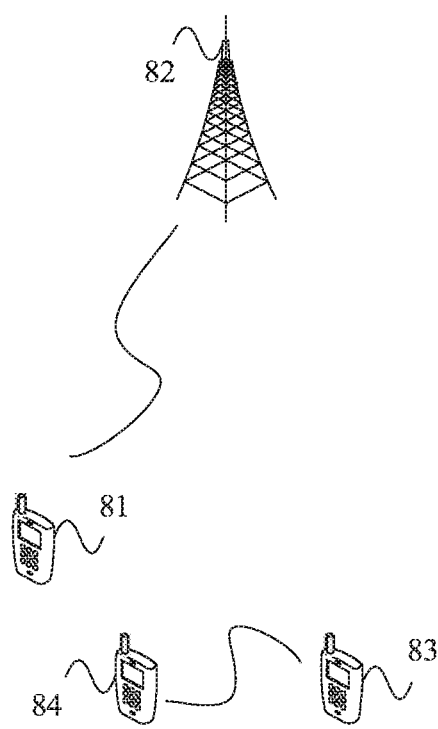
FIG. 8 is a schematic diagram of co-channel inter-system interference.

For example, in a network in which device to device (D2D) communication is used, both cellular network communication and D2D communication exist, and a same frequency resource is used for the cellular network communication and the D2D communication. FIG. 8 is a schematic diagram of co-channel inter-system interference. As shown in FIG. 8, UE 81 performs cellular network communication with a base station 82, and UE 83 performs D2D communication with UE 84. The UE 83, the UE 84, and the UE 81 belong to a same communications system of a same operator. When the UE 81 sends uplink data to the base station 82, if a distance between the UE 83 or the UE 84 and the UE 81 is relatively short, or transmit power of the UE 81 is relatively high, a signal for sending the uplink data by the UE 81 may cause interference to data transmission between the UE 83 and the UE 84.

Figure 9:
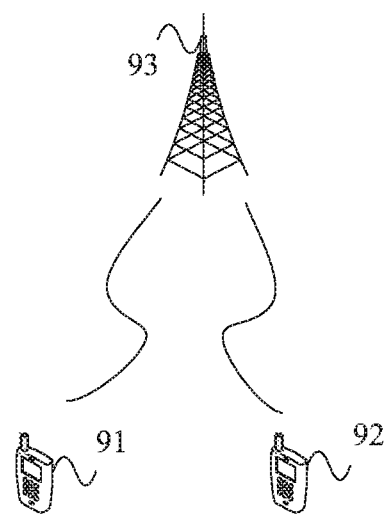
FIG. 9 is a schematic diagram of co-channel intra-system interference.

For another example, in a full duplex system, that is, in a co-channel intra-system case, the foregoing interference may also be caused. FIG. 9 is a schematic diagram of co-channel intra-system interference. As shown in FIG. 9, UE 91 and UE 92 belong to a same communications system of a same operator. The UE 91 sends uplink data to a base station 93, and the UE 92 receives downlink data sent by the base station 93. If a distance between the UE 91 and the UE 92 is relatively short, or transmit power of the UE 91 is relatively high, a signal for sending the uplink data by the UE 91 may cause interference to a signal for receiving the downlink data by the UE 92.

To resolve the problems shown in FIG. 8 and FIG. 9, the embodiments of the present invention further provide user equipment and a network device.

Figure 10:
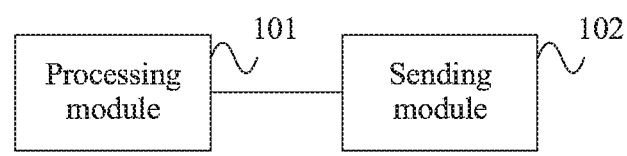
FIG. 10 is a schematic structural diagram of a fifth embodiment of the user equipment provided in the embodiments of the present invention.

FIG. 10 is a schematic structural diagram of a fifth embodiment of the user equipment provided in the embodiments of the present invention. As shown in FIG. 10, the user equipment in this embodiment includes a processing module 101 and a sending module 102.

The processing module 101 is configured to: perform channel state measurement on a first carrier to obtain channel state information CSI of each subband or each scheduling unit of the first carrier, where the scheduling unit is a smallest time-frequency resource unit scheduled in a wireless communications system in which the first communications device is located; and determine information about interference on the first carrier according to the CSI of each subband or each scheduling unit.

Specifically, the user equipment provided in this embodiment is provided in a first communications device that receives interference from another communications device, and the first communications device may be, for example, UE.

In this embodiment, co-channel inter-system interference or co-channel intra-system interference needs to be resolved. Therefore, a method the same as that used by the user equipment in the embodiment shown in FIG. 3A cannot be used to divide the first carrier and separately measure channel state information. For a co-channel system, frequency bands on which interference occurs cannot be predicted. Therefore, in this embodiment, the processing module 101 performs channel state measurement on each subband or each scheduling unit of the first carrier to obtain the CSI of each subband or each scheduling unit of the first carrier. That is, channel state measurement is performed on all frequency bands of the first carrier by using a subband CSI measurement solution. The scheduling unit is the smallest time-frequency resource unit scheduled in the wireless communications system in which the first communications device is located.

In the existing subband CSI measurement and reporting solution, after a channel state of each subband is measured, CSI of each subband is reported to a base station (that is, a second communications device). However, to reduce radio resources used to report CSI, in this embodiment, the processing module 101 further determines the information about interference on the first carrier according to the CSI of each subband or each scheduling unit. That is, similar to the embodiment shown in FIG. 7A, in this embodiment, determining whether the first communications device receives interference on the first carrier is processed in the user equipment in the first communications device.

The sending module 102 is configured to report the interference information to the second communications device.

Specifically, after the processing module 101 determines the information about interference on the first carrier, the interference information is reported to the second communications device. The second communications device is a network side device in a network. The second communications device can receive CSI reported by the first communications device. Generally, the second communications device is a base station in the network. After receiving the interference information, the second communications device may learn whether the first communications device receives interference on the first carrier, without performing other processing.

In a process of measuring and reporting CSI, a resource occupied for reporting is a radio resource of an air interface. Radio resources are limited, and cannot be increased by using a technical means. However, a processing capability of the user equipment in the first communications device can be extended by using a technical means, so that a time required for performing channel state measurement on each subband or each scheduling unit of the first carrier by the user equipment in the first communications device can be shortened, and the user equipment in the first communications device can determine the information about interference on the first carrier according to the CSI of each subband or each scheduling unit. The interference information may be indication information about whether the first communications device receives interference on a subband or a scheduling unit of the first carrier. In this way, the interference information needs to occupy only a relatively small quantity of resources.

Therefore, according to the user equipment provided in this embodiment, channel state measurement and reporting can be completed by using a relatively small quantity of radio resources. After receiving the interference information reported by the first communications device, the second communications device may schedule the first communications device away from a subband or scheduling unit on which interference is received by using a scheduling method. In this way, interference to the first communications device can be canceled.

In this embodiment, channel state measurement is performed on a first carrier to obtain CSI of each subband or each scheduling unit; information about interference on the first carrier is obtained according to the CSI of each subband or each scheduling unit, and the interference information is reported to a second communications device. In this way, user equipment can accurately measure and report a channel state by using a relatively small quantity of resources.

Further, in the embodiment shown in FIG. 10, the processing module 101 is specifically configured to: if N consecutive pieces of CSI of a first subband are lower than historical average CSI of the first subband, determine that interference is received on the first subband; or if N consecutive pieces of CSI of a first scheduling unit are lower than historical average CSI of the first scheduling unit, determine that interference is received on the first scheduling unit; and the sending module 102 is specifically configured to: if the processing module determines that interference is received on the first subband, report, to the second communications device, information about interference received on the first subband; or if the processing module determines that interference is received on the first scheduling unit, report, to the second communications device, information about interference received on the first scheduling unit.

Specifically, a specific method for determining first interference information by the processing module 101 is provided herein. If the N consecutive pieces of CSI that are of the first subband and measured by the processing module 101 are lower than the historical average CSI that is of the first subband and measured by the processing module 101, the processing module 101 determines that interference is received on the first subband of the first carrier; or if the N consecutive pieces of CSI that are of the first scheduling unit and measured by the processing module 101 are lower than the historical average CSI that is of the first scheduling unit and measured by the processing module 101, the processing module 101 determines that interference is received on the first scheduling unit of the first carrier, where N is a preset positive integer, and N≥2. The processing module 101 may periodically perform channel state measurement on the first carrier. Therefore, after obtaining multiple pieces of CSI of the first subband or the first scheduling unit by means of measurement, the processing module 101 may obtain the historical average CSI of the first subband or the first scheduling unit through calculation. If the N pieces of CSI that are of the first subband and consecutively measured by the processing module 101 are lower than the historical average CSI that is of the first subband and measured by the processing module 101, the processing module 101 may determine that the first communications device receives interference on the first subband of the first carrier; or if the N pieces of CSI that are of the first scheduling unit and consecutively measured by the processing module 101 are lower than the historical average CSI that is of the first scheduling unit and measured by the processing module 101, the processing module 101 may determine that the first communications device receives interference on the first scheduling unit of the first carrier. A value of N is determined according to a system configuration.

If the user equipment in the embodiment shown in FIG. 10 is used as the first communications device to measure and report channel state information, accordingly, a network device that receives channel state information includes: a receiving module, configured to receive the information, which is reported by the first communications device, about interference to the first communications device on the first carrier, where the interference information is determined by the first communications device according to the CSI of each subband or each scheduling unit; and a processing module, configured to determine the information about interference to the first communications device on the first carrier according to the interference information.

Figure 11:
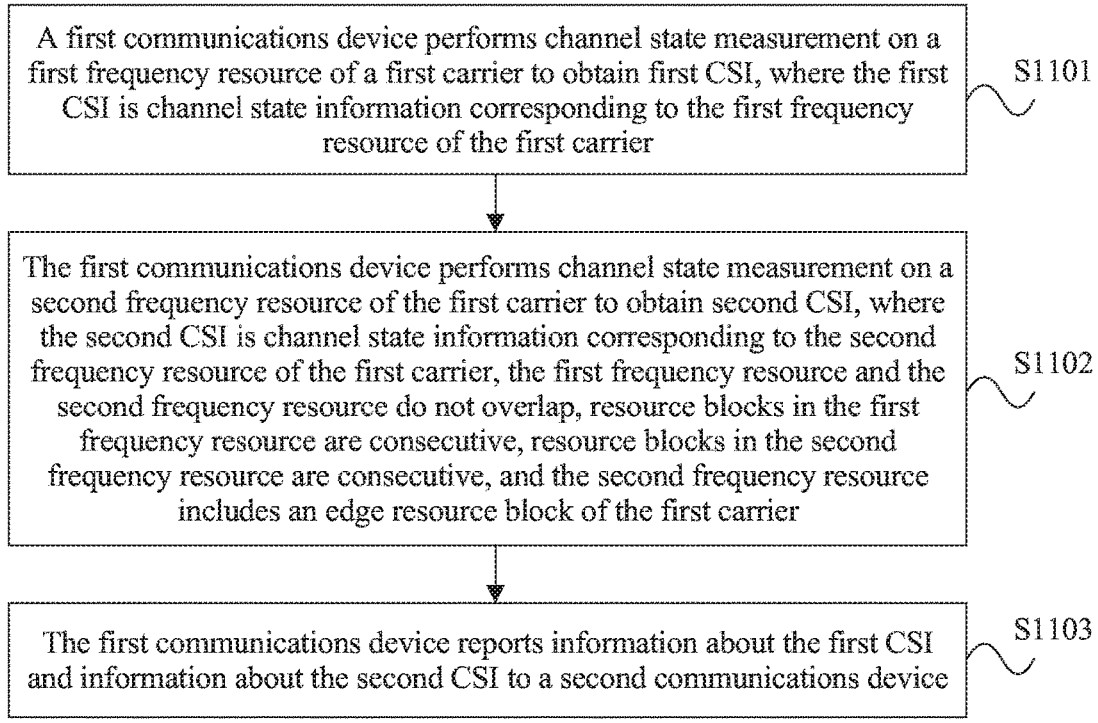
FIG. 11 is a schematic diagram of a first embodiment of a channel quality reporting method provided in the embodiments of the present invention.

FIG. 11 is a schematic diagram of a first embodiment of a channel quality reporting method provided in the embodiments of the present invention. As shown in FIG. 11, the channel quality reporting method in this embodiment includes the following steps:

Step S1101: A first communications device performs channel state measurement on a first frequency resource of a first carrier to obtain first CSI, where the first CSI is channel state information corresponding to the first frequency resource of the first carrier.

Step S1102: The first communications device performs channel state measurement on a second frequency resource of the first carrier to obtain second CSI, where the second CSI is channel state information corresponding to the second frequency resource of the first carrier, the first frequency resource and the second frequency resource do not overlap, resource blocks in the first frequency resource are consecutive, resource blocks in the second frequency resource are consecutive, and the second frequency resource includes an edge resource block of the first carrier.

Step S1103: The first communications device reports information about the first CSI and information about the second CSI to a second communications device.

The information about the first CSI includes the first CSI, and the information about the second CSI includes the second CSI; or the information about the first CSI and the information about the second CSI include first interference information.

It should be noted that, there is no order of performing step S1101 and step S1102.

The channel quality reporting method in this embodiment is used to complete processing by the user equipment shown in FIG. 3A. Implementation principles and technical effects thereof are similar, and details are not described herein.

Figure 12:
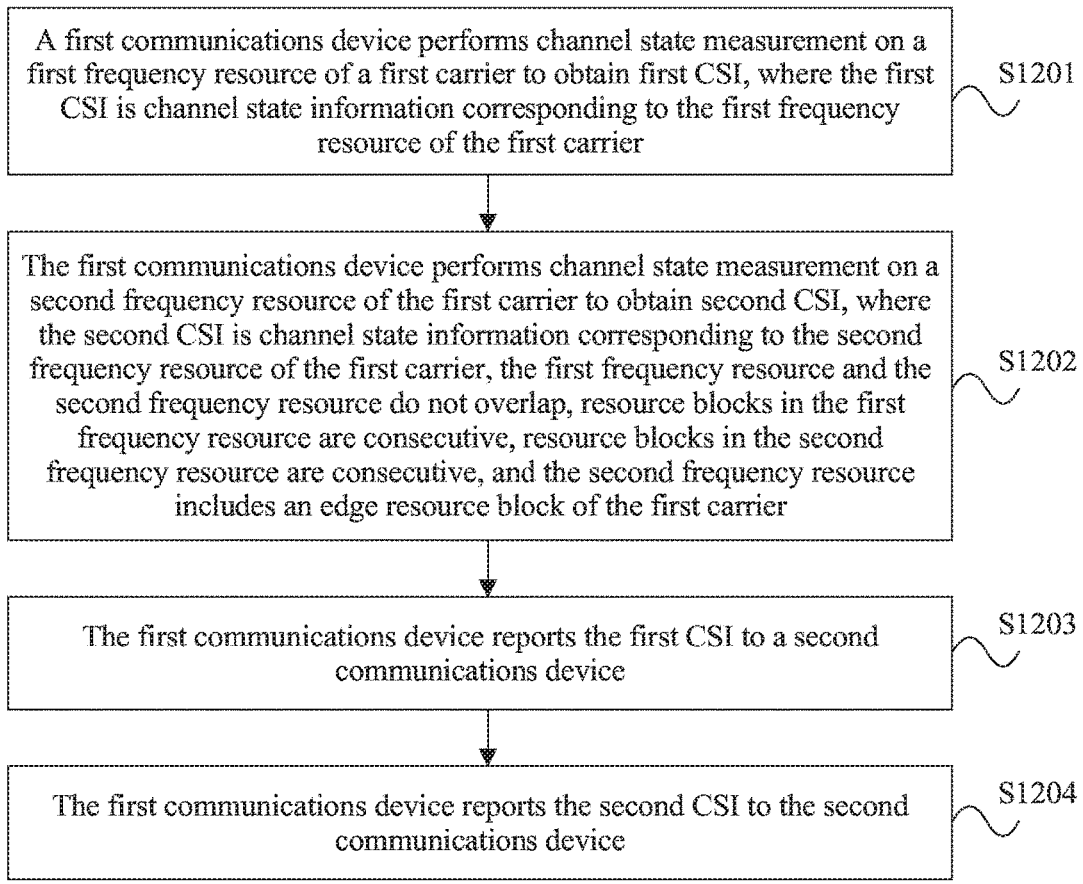
FIG. 12 is a schematic diagram of a second embodiment of the channel quality reporting method provided in the embodiments of the present invention.

FIG. 12 is a schematic diagram of a second embodiment of the channel quality reporting method provided in the embodiments of the present invention. As shown in FIG. 12, the channel quality reporting method in this embodiment includes the following steps:

Step S1201: A first communications device performs channel state measurement on a first frequency resource of a first carrier to obtain first CSI, where the first CSI is channel state information corresponding to the first frequency resource of the first carrier.

Step S1202: The first communications device performs channel state measurement on a second frequency resource of the first carrier to obtain second CSI, where the second CSI is channel state information corresponding to the second frequency resource of the first carrier, the first frequency resource and the second frequency resource do not overlap, resource blocks in the first frequency resource are consecutive, resource blocks in the second frequency resource are consecutive, and the second frequency resource includes an edge resource block of the first carrier.

Step S1203: The first communications device reports the first CSI to a second communications device.

Step S1204: The first communications device reports the second CSI to the second communications device.

It should be noted that, there is no order of performing step S1201 and step S1202, and there is no order of performing step S1203 and step S1204.

The channel quality reporting method in this embodiment is used to complete processing in an implementation manner of the user equipment shown in FIG. 3A. Implementation principles and technical effects thereof are similar, and details are not described herein.

Figure 13:
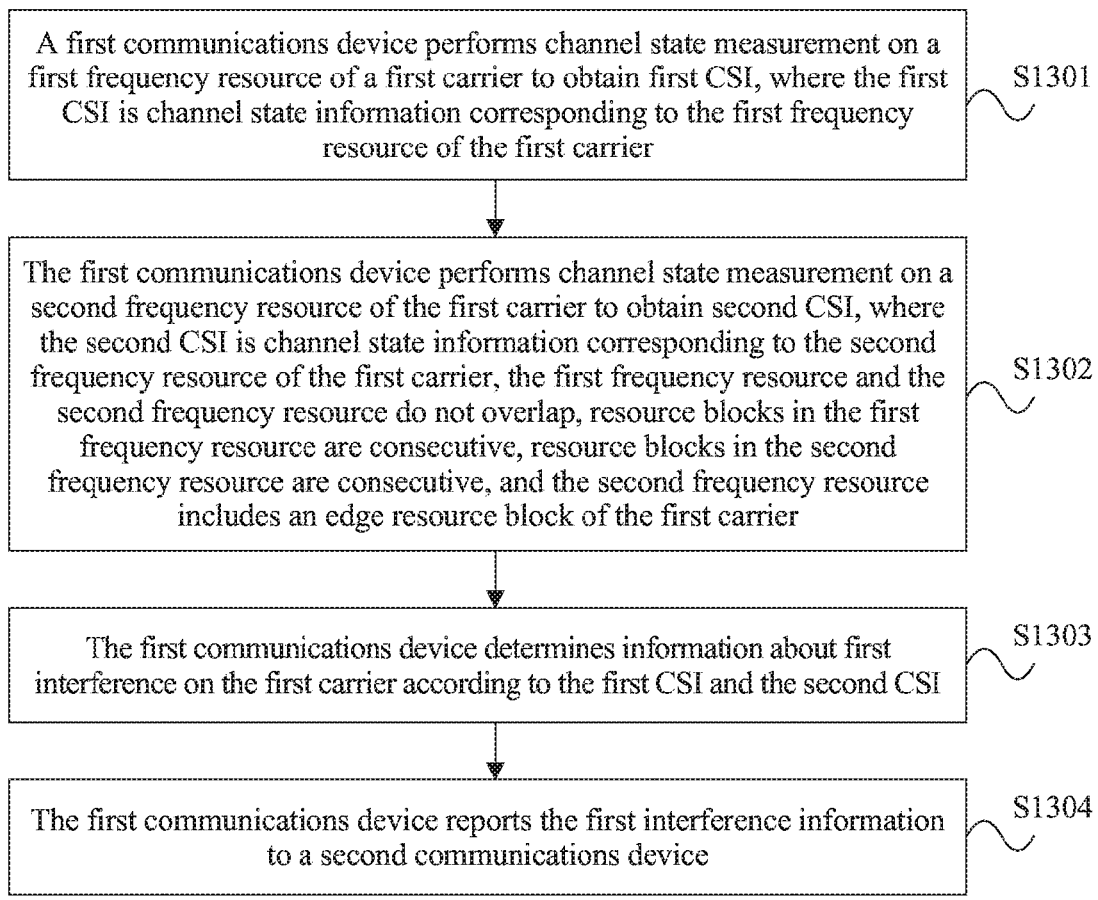
FIG. 13 is a schematic diagram of a third embodiment of the channel quality reporting method provided in the embodiments of the present invention.

FIG. 13 is a schematic diagram of a third embodiment of the channel quality reporting method provided in the embodiments of the present invention. As shown in FIG. 13, the channel quality reporting method in this embodiment includes the following steps:

Step S1301: A first communications device performs channel state measurement on a first frequency resource of a first carrier to obtain first CSI, where the first CSI is channel state information corresponding to the first frequency resource of the first carrier.

Step S1302: The first communications device performs channel state measurement on a second frequency resource of the first carrier to obtain second CSI, where the second CSI is channel state information corresponding to the second frequency resource of the first carrier, the first frequency resource and the second frequency resource do not overlap, resource blocks in the first frequency resource are consecutive, resource blocks in the second frequency resource are consecutive, and the second frequency resource includes an edge resource block of the first carrier.

Step S1303: The first communications device determines first interference information on the first carrier according to the first CSI and the second CSI.

Step S1304: The first communications device reports the first interference information to a second communications device.

It should be noted that, there is no order of performing step S1301 and step S1302.

The channel quality reporting method in this embodiment is used to complete processing in an implementation manner of the user equipment shown in FIG. 7A. Implementation principles and technical effects thereof are similar, and details are not described herein.

Further, in the embodiment shown in FIG. 13, step S1303 includes: if a difference between the first CSI and the second CSI is greater than a preset threshold, determining, by the first communications device, that interference is received on the second frequency resource of the first carrier; or if N consecutive pieces of second CSI are lower than historical average second CSI, determining, by the first communications device, that interference is received on the second frequency resource of the first carrier, where N is a preset positive integer, and N≥2; and step S1304 includes: reporting, by the first communications device to the second communications device, indication information about whether interference is received on the second frequency resource of the first carrier.

Further, in the embodiment shown in FIG. 13, step S1303 includes: determining, by the first communications device, a degree of interference received on the second frequency resource of the first carrier according to a difference range within which a difference between the first CSI and the second CSI falls; and step S1304 includes: reporting, by the first communications device to the second communications device, the degree of interference received on the second frequency resource of the first carrier.

Further, in the embodiments shown in FIG. 11 to FIG. 13, the first CSI is average channel state information corresponding to the first frequency resource, and the second CSI is average channel state information corresponding to the second frequency resource.

Further, in the embodiments shown in FIG. 11 to FIG. 13, the second frequency resource is a frequency resource that is of the first carrier and that is subject to potential interference, and the first frequency resource is a frequency resource that is of the first carrier and that is subject to no potential interference.

Further, in the embodiments shown in FIG. 11 to FIG. 13, before that a first communications device performs channel state measurement on a first frequency resource of a first carrier to obtain first CSI, the method further includes: obtaining, by the first communications device, frequency band information of the first frequency resource; and before that the first communications device performs channel state measurement on a second frequency resource of the first carrier to obtain second CSI, the method further includes: obtaining, by the first communications device, frequency band information of the second frequency resource.

Further, in the embodiments shown in FIG. 11 to FIG. 13, the obtaining, by the first communications device, frequency band information of the first frequency resource includes: obtaining, by the first communications device, the frequency band information of the first frequency resource from preset information, or obtaining, by the first communications device, the frequency band information of the first frequency resource from notification information sent by the second communications device. The obtaining, by the first communications device, frequency band information of the second frequency resource includes: obtaining, by the first communications device, the frequency band information of the second frequency resource from preset information, or obtaining, by the first communications device, the frequency band information of the second frequency resource from notification information sent by the second communications device.

Further, in the embodiments shown in FIG. 11 to FIG. 13, the frequency band information of the first frequency resource includes information used to indicate a location and/or bandwidth of the first frequency resource. The frequency band information of the second frequency resource includes information used to indicate a location and/or bandwidth of the second frequency resource.

Further, in the embodiments shown in FIG. 11 to FIG. 13, that a first communications device performs channel state measurement on a first frequency resource of a first carrier to obtain first CSI includes: periodically performing, by the first communications device, channel state measurement on the first frequency resource of the first carrier to obtain the first CSI; that the first communications device performs channel state measurement on a second frequency resource of the first carrier to obtain second CSI includes: periodically performing, by the first communications device, channel state measurement on the second frequency resource of the first carrier to obtain the second CSI; and that the first communications device reports information about the first CSI and information about the second CSI to a second communications device includes: periodically reporting, by the first communications device, the information about the first CSI and the information about the second CSI to the second communications device.

Figure 14:
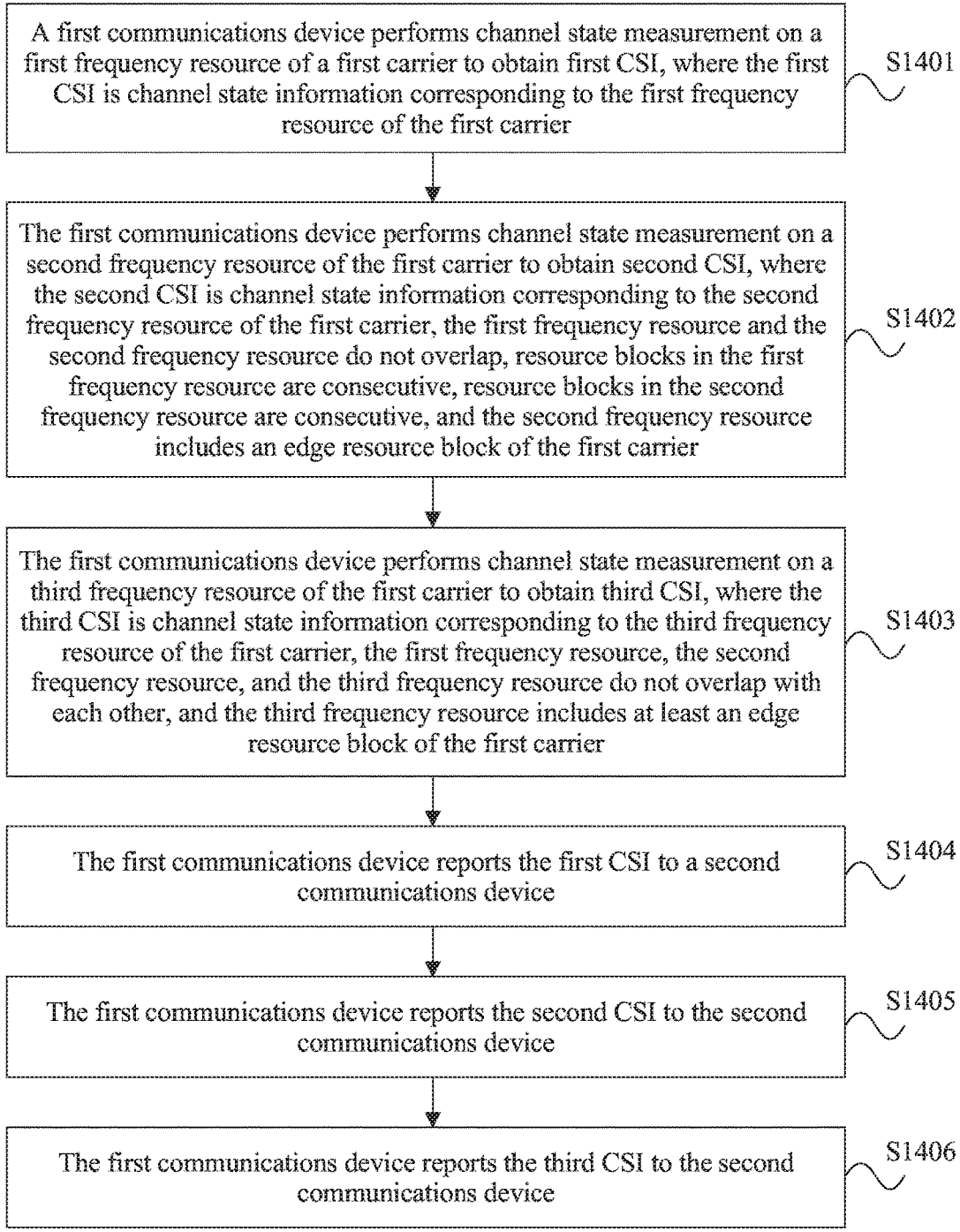
FIG. 14 is a schematic diagram of a fourth embodiment of the channel quality reporting method provided in the embodiments of the present invention.

FIG. 14 is a schematic diagram of a fourth embodiment of the channel quality reporting method provided in the embodiments of the present invention. As shown in FIG. 14, the channel quality reporting method in this embodiment includes the following steps:

Step S1401: A first communications device performs channel state measurement on a first frequency resource of a first carrier to obtain first CSI, where the first CSI is channel state information corresponding to the first frequency resource of the first carrier.

Step S1402: The first communications device performs channel state measurement on a second frequency resource of the first carrier to obtain second CSI, where the second CSI is channel state information corresponding to the second frequency resource of the first carrier, the first frequency resource and the second frequency resource do not overlap, resource blocks in the first frequency resource are consecutive, resource blocks in the second frequency resource are consecutive, and the second frequency resource includes an edge resource block of the first carrier.

Step S1403: The first communications device performs channel state measurement on a third frequency resource of the first carrier to obtain third CSI, where the third CSI is channel state information corresponding to the third frequency resource of the first carrier, the first frequency resource, the second frequency resource, and the third frequency resource do not overlap with each other, and the third frequency resource includes at least an edge resource block of the first carrier.

Step S1404: The first communications device reports the first CSI to a second communications device.

Step S1405: The first communications device reports the second CSI to the second communications device.

Step S1406: The first communications device reports the third CSI to the second communications device.

It should be noted that, there is no order of performing step S1401, step S1402, and step S1403, and there is no order of performing step S1404, step S1405, and step S1406.

Figure 15:
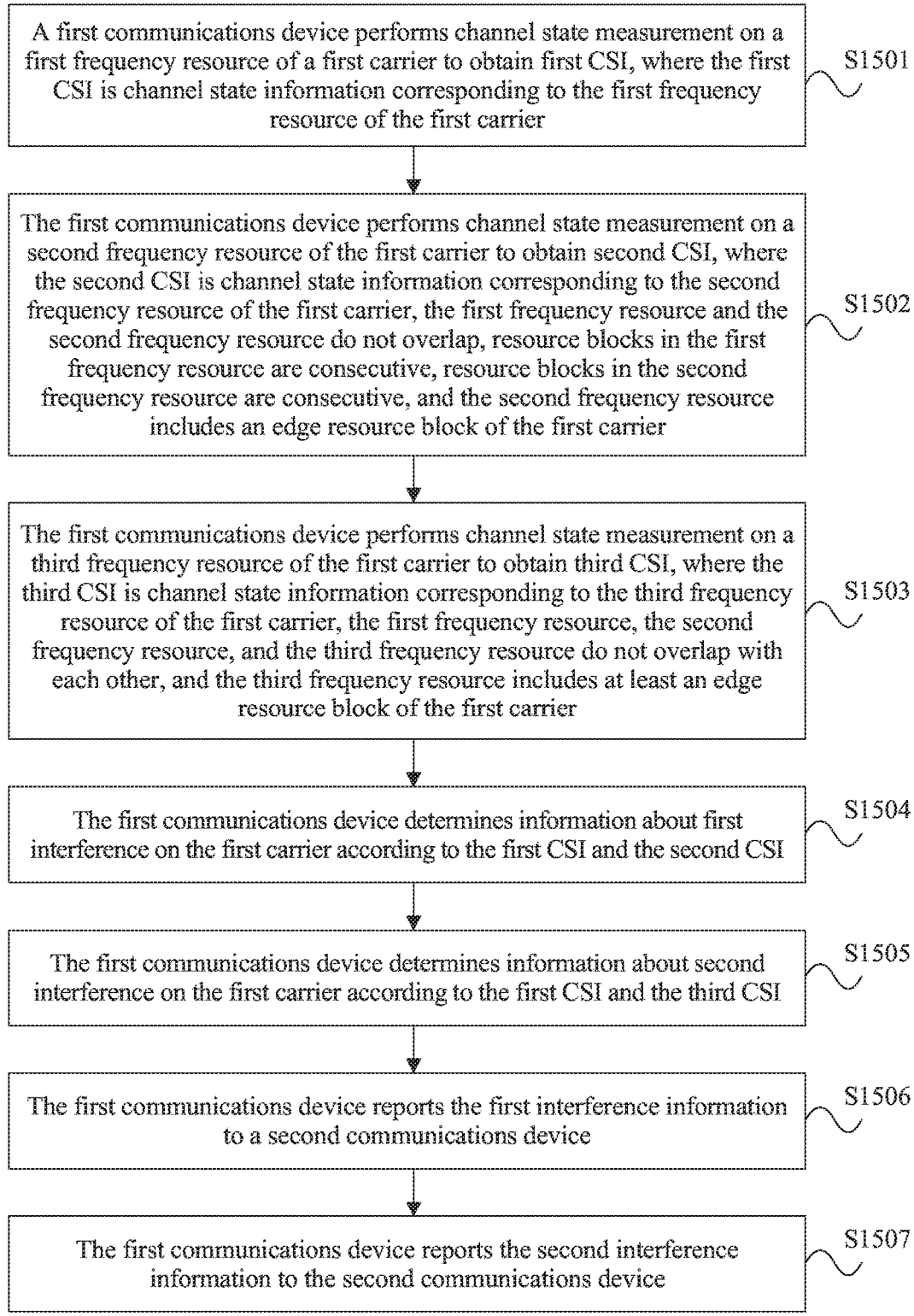
FIG. 15 is a schematic diagram of a fifth embodiment of the channel quality reporting method provided in the embodiments of the present invention.

FIG. 15 is a schematic diagram of a fifth embodiment of the channel quality reporting method provided in the embodiments of the present invention. As shown in FIG. 15, the channel quality reporting method in this embodiment includes the following steps:

Step S1501: A first communications device performs channel state measurement on a first frequency resource of a first carrier to obtain first CSI, where the first CSI is channel state information corresponding to the first frequency resource of the first carrier.

Step S1502: The first communications device performs channel state measurement on a second frequency resource of the first carrier to obtain second CSI, where the second CSI is channel state information corresponding to the second frequency resource of the first carrier, the first frequency resource and the second frequency resource do not overlap, resource blocks in the first frequency resource are consecutive, resource blocks in the second frequency resource are consecutive, and the second frequency resource includes an edge resource block of the first carrier.

Step S1503: The first communications device performs channel state measurement on a third frequency resource of the first carrier to obtain third CSI, where the third CSI is channel state information corresponding to the third frequency resource of the first carrier, the first frequency resource, the second frequency resource, and the third frequency resource do not overlap with each other, and the third frequency resource includes at least an edge resource block of the first carrier.

Step S1504: The first communications device determines first interference information on the first carrier according to the first CSI and the second CSI.

Step S1505: The first communications device determines second interference information on the first carrier according to the first CSI and the third CSI.

Step S1506: The first communications device reports the first interference information to a second communications device.

Step S1507: The first communications device reports the second interference information to the second communications device.

It should be noted that, there is no order of performing step S1501, step S1502, and step S1503, there is no order of performing step S1504 and step S1505, and there is no order of performing step S1506 and step S1507.

Further, in the embodiment shown in FIG. 15, step S1505 includes: if a difference between the first CSI and the third CSI is greater than a preset threshold, determining, by the first communications device, that interference is received on the third frequency resource of the first carrier; or if M consecutive pieces of third CSI are lower than historical average third CSI, determining, by the first communications device, that interference is received on the third frequency resource of the first carrier, where M is a preset positive integer, and M≥2; and step S1507 includes: reporting, by the first communications device to the second communications device, indication information about whether interference is received on the third frequency resource of the first carrier.

Further, in the embodiment shown in FIG. 15, step S1505 includes: determining, by the first communications device, a degree of interference received on the third frequency resource of the first carrier according to a difference range within which a difference between the first CSI and the third CSI falls; and step S1507 includes: reporting, by the first communications device to the second communications device, the degree of interference received on the third frequency resource of the first carrier.

Further, in the embodiment shown in FIG. 14 or FIG. 15, the third CSI is average channel state information corresponding to the third frequency resource.

Further, in the embodiment shown in FIG. 14 or FIG. 15, the third frequency resource is a frequency resource that is of the first carrier and that is subject to potential interference.

Further, in the embodiment shown in FIG. 14 or FIG. 15, before that the first communications device performs channel state measurement on a third frequency resource of the first carrier to obtain third CSI, the method further includes: obtaining, by the first communications device, frequency band information of the third frequency resource.

Further, in the embodiment shown in FIG. 14 or FIG. 15, the obtaining, by the first communications device, frequency band information of the third frequency resource includes: obtaining, by the first communications device, the frequency band information of the third frequency resource from preset information, or obtaining, by the first communications device, the frequency band information of the third frequency resource from notification information sent by the second communications device.

Further, in the embodiment shown in FIG. 14 or FIG. 15, the frequency band information of the third frequency resource includes information used to indicate a location and/or bandwidth of the third frequency resource.

Further, in the embodiment shown in FIG. 14 or FIG. 15, that the first communications device performs channel state measurement on a third frequency resource of the first carrier to obtain third CSI includes: periodically performing, by the first communications device, channel state measurement on the third frequency resource of the first carrier to obtain the third CSI; and that the first communications device reports the third CSI to the second communications device includes: periodically reporting, by the first communications device, the third CSI to the second communications device. That the first communications device reports the second interference information to the second communications device includes: periodically reporting, by the first communications device, the second interference information to the second communications device.

FIG. 16 is a schematic diagram of a sixth embodiment of the channel quality reporting method provided in the embodiments of the present invention. As shown in FIG. 16, the channel quality reporting method in this embodiment includes the following steps:

Step S1601: A second communications device receives information about first CSI and information about second CSI that are reported by a first communications device, where the information about the first CSI is information about channel state information corresponding to a first frequency resource of a first carrier, the information about the second CSI is information about channel state information corresponding to a second frequency resource of the first carrier, the first frequency resource and the second frequency resource do not overlap, resource blocks in the first frequency resource are consecutive, resource blocks in the second frequency resource are consecutive, and the second frequency resource includes an edge resource block of the first carrier.

Step S1602: The second communications device determines information about interference to the first communications device on the first carrier according to the information about the first CSI and the information about the second CSI.

The information about the first CSI includes the first CSI, and the information about the second CSI includes the second CSI; or the information about the first CSI and the information about the second CSI include first interference information.

The channel quality reporting method in this embodiment is used to complete processing by the network device shown in FIG. 5. Implementation principles and technical effects thereof are similar, and details are not described herein.

FIG. 17 is a schematic diagram of a seventh embodiment of the channel quality reporting method provided in the embodiments of the present invention. As shown in FIG. 17, the channel quality reporting method in this embodiment includes the following steps:

Step S1701: A second communications device receives first CSI reported by a first communications device, where the first CSI is channel state information corresponding to a first frequency resource of a first carrier.

Step S1702: The second communications device receives second CSI reported by the first communications device, where the second CSI is channel state information corresponding to a second frequency resource of the first carrier, the first frequency resource and the second frequency resource do not overlap, resource blocks in the first frequency resource are consecutive, resource blocks in the second frequency resource are consecutive, and the second frequency resource includes an edge resource block of the first carrier.

Step S1703: The second communications device determines information about interference to the first communications device on the first carrier according to the first CSI and the second CSI.

It should be noted that, there is no order of performing step S1701 and step S1702.

Further, in the embodiment shown in FIG. 17, step S1703 includes: if a difference between the first CSI and the second CSI is greater than a preset threshold, determining, by the second communications device, that the first communications device receives interference on the second frequency resource of the first carrier; or if consecutively received N pieces of second CSI are lower than historical average second CSI, determining, by the second communications device, that the first communications device receives interference on the second frequency resource of the first carrier, where N is a preset positive integer, and N≥2.

Figure 18:
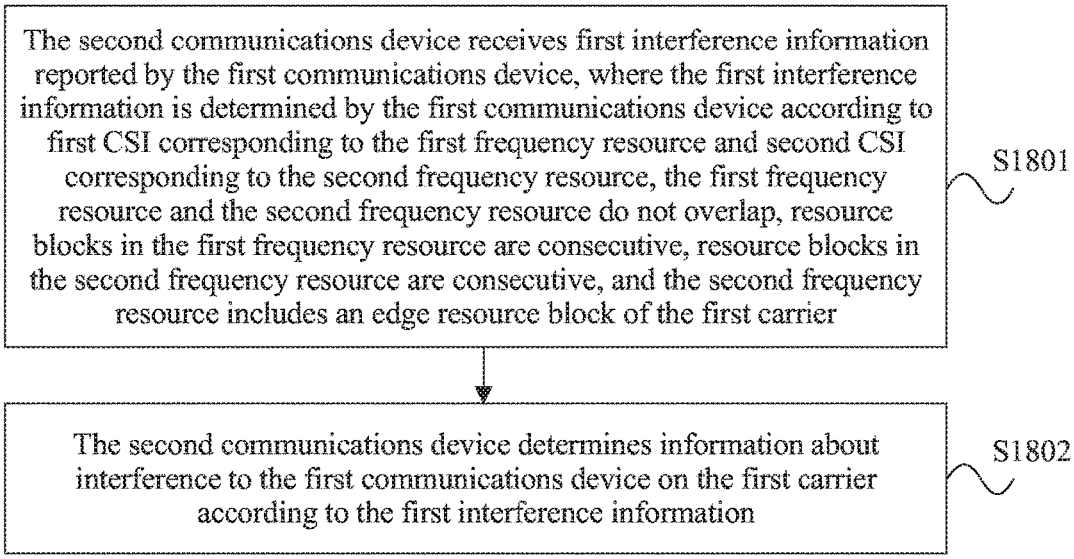
FIG. 18 is a schematic diagram of an eighth embodiment of the channel quality reporting method provided in the embodiments of the present invention.

FIG. 18 is a schematic diagram of an eighth embodiment of the channel quality reporting method provided in the embodiments of the present invention. As shown in FIG. 18, the channel quality reporting method in this embodiment includes the following steps:

Step S1801: A second communications device receives first interference information reported by a first communications device, where the first interference information is determined by the first communications device according to first CSI corresponding to a first frequency resource and second CSI corresponding to a second frequency resource, the first frequency resource and the second frequency resource do not overlap, resource blocks in the first frequency resource are consecutive, resource blocks in the second frequency resource are consecutive, and the second frequency resource includes an edge resource block of a first carrier.

Step S1802: The second communications device determines information about interference to the first communications device on the first carrier according to the first interference information.

Further, in the embodiments shown in FIG. 16 to FIG. 18, the information about the first CSI is information about average channel state information corresponding to the first frequency resource, and the information about the second CSI is information about average channel state information corresponding to the second frequency resource.

Further, in the embodiments shown in FIG. 16 to FIG. 18, the second frequency resource is a frequency resource that is of the first carrier and that is subject to potential interference, and the first frequency resource is a frequency resource that is of the first carrier and that is subject to no potential interference.

Further, in the embodiments shown in FIG. 16 to FIG. 18, before that a second communications device receives information that is about first CSI and reported by a first communications device, the method further includes: sending, by the second communications device, a notification message to the first communications device, where the notification message includes frequency band information of the first frequency resource; and before that a second communications device receives information that is about second CSI and reported by the first communications device, the method further includes: sending, by the second communications device, a notification message to the first communications device, where the notification message includes frequency band information of the second frequency resource.

Further, in the embodiments shown in FIG. 16 to FIG. 18, the frequency band information of the first frequency resource includes information used to indicate a location and/or bandwidth of the first frequency resource, and the frequency band information of the second frequency resource includes information used to indicate a location and/or bandwidth of the second frequency resource.

Further, in the embodiments shown in FIG. 16 to FIG. 18, that a second communications device receives information that is about first CSI and reported by a first communications device includes: receiving, by the second communications device, the information that is about the first CSI and periodically reported by the first communications device; and that a second communications device receives information that is about second CSI and reported by the first communications device includes: receiving, by the second communications device, the information that is about the second CSI and periodically reported by the first communications device.

Figure 19:
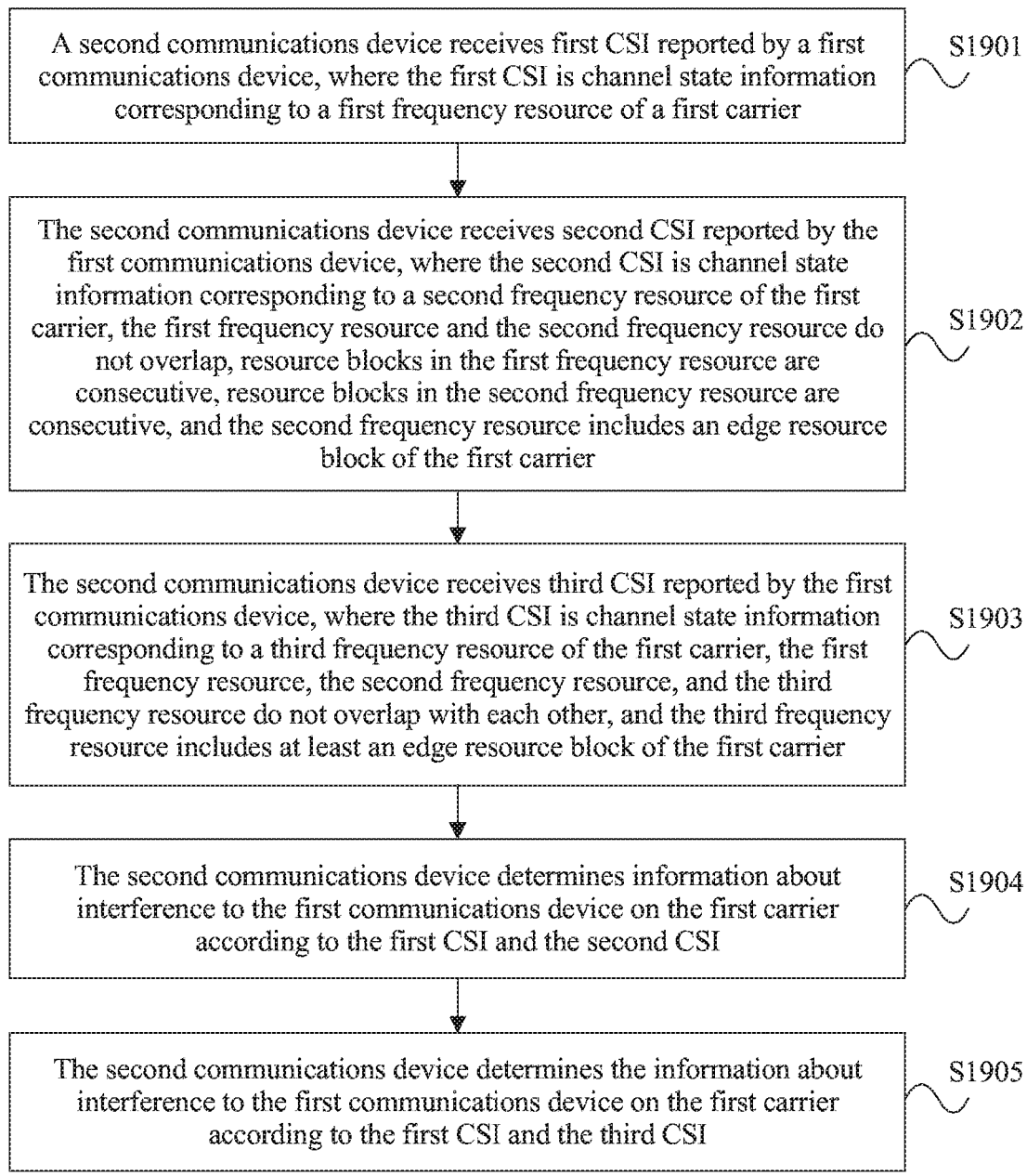
FIG. 19 is a schematic diagram of a ninth embodiment of the channel quality reporting method provided in the embodiments of the present invention.

FIG. 19 is a schematic diagram of a ninth embodiment of the channel quality reporting method provided in the embodiments of the present invention. As shown in FIG. 19, the channel quality reporting method in this embodiment includes the following steps:

Step S1901: A second communications device receives first CSI reported by a first communications device, where the first CSI is channel state information corresponding to a first frequency resource of a first carrier.

Step S1902: The second communications device receives second CSI reported by the first communications device, where the second CSI is channel state information corresponding to a second frequency resource of the first carrier, the first frequency resource and the second frequency resource do not overlap, resource blocks in the first frequency resource are consecutive, resource blocks in the second frequency resource are consecutive, and the second frequency resource includes an edge resource block of the first carrier.

Step S1903: The second communications device receives third CSI reported by the first communications device, where the third CSI is channel state information corresponding to a third frequency resource of the first carrier, the first frequency resource, the second frequency resource, and the third frequency resource do not overlap with each other, and the third frequency resource includes at least an edge resource block of the first carrier.

Step S1904: The second communications device determines information about interference to the first communications device on the first carrier according to the first CSI and the second CSI.

Step S1905: The second communications device determines the information about interference to the first communications device on the first carrier according to the first CSI and the third CSI.

It should be noted that there is no order of performing step S1901, step S1902, and step S1903, and there is no order of performing step S1904 and step S1905.

Further, in the embodiment shown in FIG. 19, step S1905 includes: if a difference between the first CSI and the third CSI is greater than a preset threshold, determining, by the second communications device, that the first communications device receives interference on the third frequency resource of the first carrier; or if consecutively received M pieces of third CSI are lower than historical average third CSI, determining, by the second communications device, that the first communications device receives interference on the third frequency resource of the first carrier, where M is a preset positive integer, and M≥2.

Figure 20:
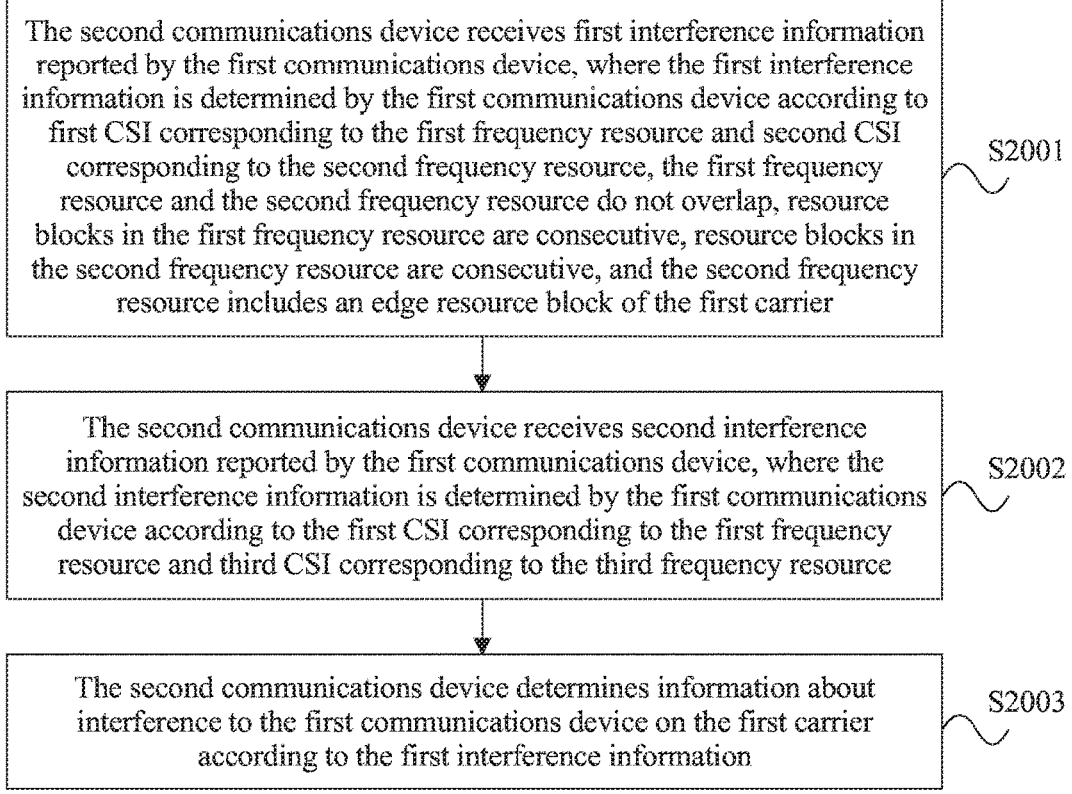
FIG. 20 is a schematic diagram of a tenth embodiment of the channel quality reporting method provided in the embodiments of the present invention.

FIG. 20 is a schematic diagram of a tenth embodiment of the channel quality reporting method provided in the embodiments of the present invention. As shown in FIG. 20, the channel quality reporting method in this embodiment includes the following steps:

Step S2001: A second communications device receives first interference information reported by a first communications device, where the first interference information is determined by the first communications device according to first CSI corresponding to a first frequency resource and second CSI corresponding to a second frequency resource, the first frequency resource and the second frequency resource do not overlap, resource blocks in the first frequency resource are consecutive, resource blocks in the second frequency resource are consecutive, and the second frequency resource includes an edge resource block of a first carrier.

Step S2002: The second communications device receives second interference information reported by the first communications device, where the second interference information is determined by the first communications device according to the first CSI corresponding to the first frequency resource and third CSI corresponding to a third frequency resource.

Step S2003: The second communications device determines information about interference to the first communications device on the first carrier according to the first interference information.

Further, in the embodiment shown in FIG. 19 or FIG. 20, the third CSI is average channel state information corresponding to the third frequency resource.

Further, in the embodiment shown in FIG. 19 or FIG. 20, the third frequency resource is a frequency resource that is of the first carrier and that is subject to potential interference.

Further, in the embodiment shown in FIG. 19 or FIG. 20, before step S1903 or step S2002, the method further includes: sending, by the second communications device, a notification message to the first communications device, where the notification message includes frequency band information of the third frequency resource Further, in the embodiment shown in FIG. 19 or FIG. 20, the frequency band information of the third frequency resource includes information used to indicate a location and/or bandwidth of the third frequency resource.

Further, in the embodiment shown in FIG. 19 or FIG. 20, step S1903 includes: receiving, by the second communications device, the third CSI periodically reported by the first communications device. Step S2002 includes: receiving, by the second communications device, the second interference information periodically reported by the first communications device.

Figure 21:
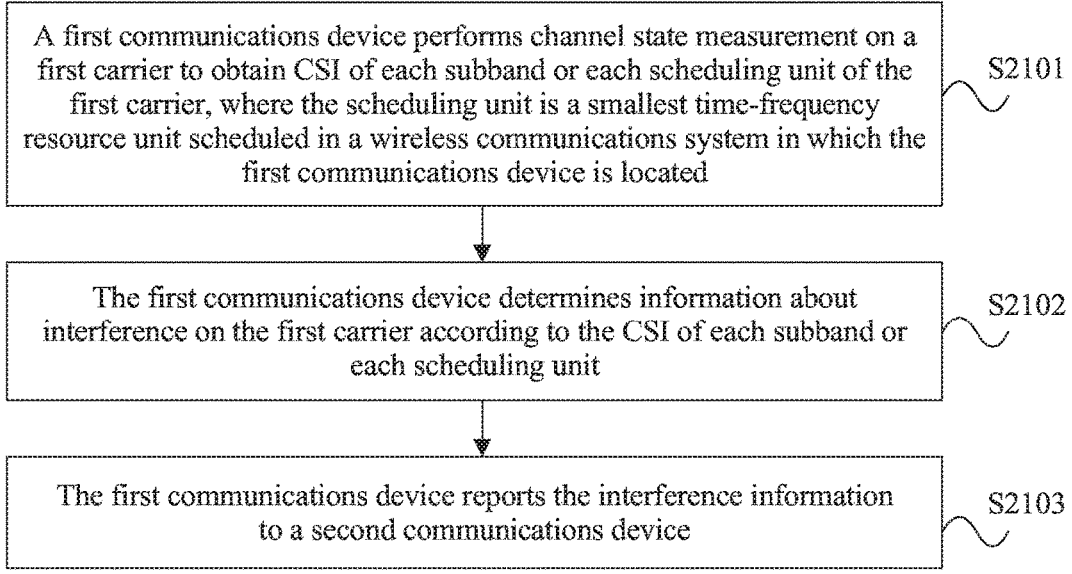
FIG. 21 is a schematic diagram of an eleventh embodiment of the channel quality reporting method provided in the embodiments of the present invention.

FIG. 21 is a schematic diagram of an eleventh embodiment of the channel quality reporting method provided in the embodiments of the present invention. As shown in FIG. 21, the channel quality reporting method in this embodiment includes the following steps:

Step S2101: A first communications device performs channel state measurement on a first carrier to obtain CSI of each subband or each scheduling unit of the first carrier, where the scheduling unit is a smallest time-frequency resource unit scheduled in a wireless communications system in which the first communications device is located.

Step S2102: The first communications device determines information about interference on the first carrier according to the CSI of each subband or each scheduling unit.

Step S2103: The first communications device reports the interference information to a second communications device.

The channel quality reporting method in this embodiment is used to complete processing by the user equipment shown in FIG. 10. Implementation principles and technical effects thereof are similar, and details are not described herein.

Further, in the embodiment shown in FIG. 21, step S2102 includes: if N consecutive pieces of CSI of a first subband are lower than historical average CSI of the first subband, determining, by the first communications device, that interference is received on the first subband; or if N consecutive pieces of CSI of a first scheduling unit are lower than historical average CSI of the first scheduling unit, determining, by the first communications device, that interference is received on the first scheduling unit; and step S2103 includes: if the first communications device determines that interference is received on the first subband, reporting, by the first communications device to the second communications device, information about interference received on the first subband; or if the first communications device determines that interference is received on the first scheduling unit, reporting, by the first communications device to the second communications device, information about interference received on the first scheduling unit.

Figure 22:
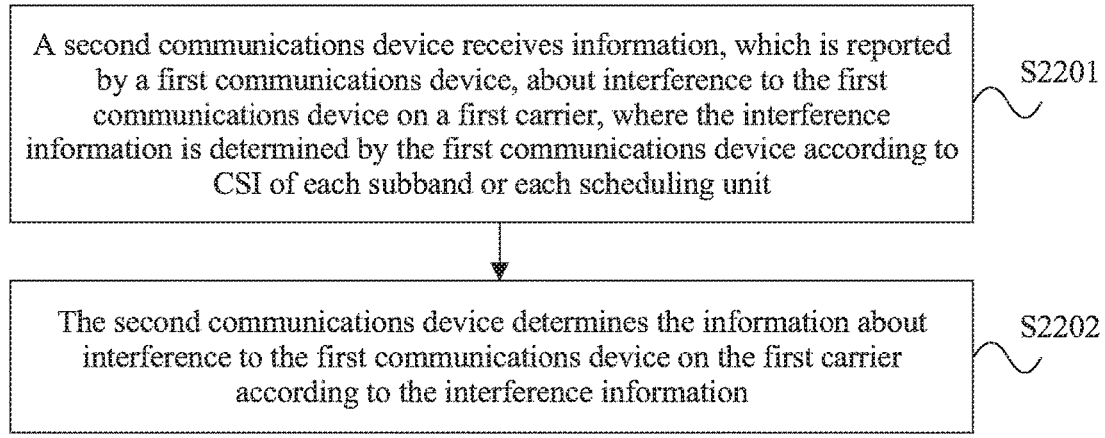
FIG. 22 is a schematic diagram of a twelfth embodiment of the channel quality reporting method provided in the embodiments of the present invention.

FIG. 22 is a schematic diagram of a twelfth embodiment of the channel quality reporting method provided in the embodiments of the present invention. As shown in FIG. 22, the channel quality reporting method in this embodiment includes the following steps:

Step S2201: A second communications device receives information, which is reported by a first communications device, about interference to the first communications device on a first carrier, where the interference information is determined by the first communications device according to CSI of each subband or each scheduling unit.

Step S2202: The second communications device determines the information about interference to the first communications device on the first carrier according to the interference information.

It should be noted that, in the embodiments of the present invention, the processing module 31, the processing module 71, or the processing module 101 may be corresponding to a processor in user equipment. The processor herein may be a central processing unit (Central Processing Unit, CPU), an application-specific integrated circuit (Application Specific Integrated Circuit, ASIC), or one or more integrated circuits that complete the embodiments of the present invention. The sending module 32, the sending module 72, or the sending module 102 may be corresponding to a transmitter in the user equipment, or may be corresponding to a transceiver in the user equipment. The receiving module 34 or the receiving module 74 may be corresponding to a receiver in the user equipment, or may be corresponding to a transceiver in the user equipment. The storage module 33 or the storage module 73 may be corresponding to a memory in the user equipment. The memory is configured to store instruction code. The processor invokes the instruction code in the memory, to control other modules in the user equipment in the embodiments of the present invention to perform the foregoing operations.

The receiving module 51 in the embodiments of the present invention may be corresponding to a receiver in a network device, or may be corresponding to a transceiver in a network device. The processing module 52 may be corresponding to a processor in the network device. The processor herein may be a CPU, an ASIC, or one or more integrated circuits that complete the embodiments of the present invention. The sending module 53 may be corresponding to a transmitter in the network device, or may be corresponding to a transceiver in the network device. The network device may further include a memory, and the memory is configured to store instruction code. The processor calls the instruction code in the memory, to control the receiving module 51 and the sending module 53 in the embodiments of the present invention to perform the foregoing operations.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof. Therefore, the protection scope of the present invention shall be subject to the protection scope of the claims.

What is claimed is:

1. A terminal device, comprising:
a processor;
a receiver; and
a transmitter, wherein the processor is coupled with the receiver and the transmitter;
wherein the processor is configured to:
perform channel state measurement on a first frequency resource of a first carrier to obtain first channel state information (CSI); and
perform channel state measurement on a second frequency resource of the first carrier to obtain second CSI, wherein the first frequency resource and the second frequency resource do not overlap, resource blocks in the first frequency resource are consecutive, resource blocks in the second frequency resource are consecutive, and the second frequency resource comprises an edge resource block of the first carrier;
wherein the transmitter is configured to report information about the first CSI and information about the second CSI to a second communications device; and
wherein the terminal device is attached to the second communication device and uses a first frequency band to communicate with the second communication device, the second frequency resource is comprised in the first frequency band, the terminal device is in range of a second terminal device attached to a third communication device, the third communication device uses a second frequency band to communicate, the first frequency band and the second frequency band are adjacent but do not overlap, the edge resource block of the first carrier is an edge resource block of the first carrier that is adjacent to the second frequency band, and the second communication device and the third communication device belong to different operators or different communication systems.

2. The terminal device according to claim 1, wherein the information about the first CSI comprises the first CSI, and the information about the second CSI comprises the second CSI; and
wherein the transmitter is configured to report the information about the first CSI and the information about the second CSI to the second communications device by reporting the first CSI to the second communications device, and reporting the second CSI to the second communications device.

3. The terminal device according to claim 1, wherein the information about the first CSI and information about the second CSI comprise first interference information;
wherein the processor is further configured to determine the first interference information on the first carrier according to the first CSI and the second CSI; and
wherein the transmitter is configured to report the information about the first CSI and the information about the second CSI to the second communications device by reporting the first interference information to the second communications device.

4. The terminal device according to claim 3, wherein the processor is configured to determine the first interference information in the following manner:
when a difference between the first CSI and the second CSI is greater than a preset threshold, determining that interference is received on the second frequency resource of the first carrier, or when N consecutive pieces of second CSI are lower than historical average second CSI measured by the processor, determining that interference is received on the second frequency resource of the first carrier, wherein N is a preset positive integer, and N≥2; and
the first interference information indicates whether interference is received on the second frequency resource of the first carrier.

5. The terminal device according to claim 3, wherein the processor is configured to determine the first interference information by determining a degree of interference received on the second frequency resource of the first carrier according to a difference range within which a difference between the first CSI and the second CSI falls, wherein the first interference information indicates the degree of interference received on the second frequency resource of the first carrier.

6. The terminal device according to claim 1, wherein the first CSI is average channel state information corresponding to the first frequency resource, and the second CSI is average channel state information corresponding to the second frequency resource.

7. The terminal device according to claim 1, wherein the processor is further configured to:
  before performing channel state measurement on the first frequency resource of the first carrier to obtain the first CSI, obtain frequency band information of the first frequency resource; and
  before performing channel state measurement on the second frequency resource of the first carrier to obtain the second CSI, obtain frequency band information of the second frequency resource.

8. The terminal device according to claim 7, wherein the processor is configured to:
  obtain frequency band information of the first frequency resource by obtaining the frequency band information of the first frequency resource from preset information, or obtaining the frequency band information of the first frequency resource from notification information sent by the second communications device; and
  obtain frequency band information of the second frequency resource by obtaining the frequency band information of the second frequency resource from preset information, or obtaining the frequency band information of the second frequency resource from notification information sent by the second communications device.

9. The terminal device according to claim 1, wherein:
  the processor is configured to periodically perform channel state measurement on the first frequency resource to obtain the first CSI, and periodically perform channel state measurement on the second frequency resource to obtain the second CSI; and
  the transmitter is configured to periodically report the information about the first CSI and the information about the second CSI to the second communications device.

10. The terminal device according to claim 1, wherein the second frequency resource is subject to potential interference from the second terminal device, and the first frequency resource is subject to no potential interference from the second terminal device.

11. A method, comprising:
  performing, by a first communications device, channel state measurement on a first frequency resource of a first carrier to obtain first channel state information (CSI);
  performing, by the first communications device, channel state measurement on a second frequency resource of the first carrier to obtain second CSI, wherein the first frequency resource and the second frequency resource do not overlap, resource blocks in the first frequency resource are consecutive, resource blocks in the second frequency resource are consecutive, and the second frequency resource comprises an edge resource block of the first carrier;
  after obtaining the first CSI and the second CSI, determining, by the first communications device, first interference information on the first carrier using the first CSI and the second CSI; and
  reporting, by the first communications device, the first interference information to a second communications device;
  wherein the first communications device is attached to the second communication device and uses a first frequency band to communicate with the second communication device, the second frequency resource is comprised in the first frequency band, the first communications device is in range of a terminal device attached to a third communication device, the third communication device uses a second frequency band to communicate, the first frequency band and the second frequency band are adjacent but do not overlap, the edge resource block of the first carrier is an edge resource block of the first carrier that is adjacent to the second frequency band, and the second communication device and the third communication device belong to different operators or different communication systems.

12. The method according to claim 11, wherein determining, by the first communications device, the first interference information on the first carrier using the first CSI and the second CSI comprises:
  when a difference between the first CSI and the second CSI is greater than a preset threshold, determining, by the first communications device, that interference is received on the second frequency resource of the first carrier; or when N consecutive pieces of second CSI are lower than historical average second CSI, determining, by the first communications device, that interference is received on the second frequency resource of the first carrier, wherein N is a preset positive integer, and N≥2;
  wherein the first interference information indicates whether interference is received on the second frequency resource of the first carrier.

13. The method according to claim 11, wherein determining, by the first communications device, the first interference information on the first carrier using the first CSI and the second CSI comprises:
  determining, by the first communications device, a degree of interference received on the second frequency resource of the first carrier according to a difference range within which a difference between the first CSI and the second CSI falls, wherein the first interference information indicates the degree of interference received on the second frequency resource of the first carrier.

14. The method according to claim 11, wherein the first CSI is average channel state information corresponding to the first frequency resource, and the second CSI is average channel state information corresponding to the second frequency resource.

15. The method according to claim 11, wherein before performing, by the first communications device, channel state measurement on the first frequency resource of the first carrier to obtain first CSI, the method further comprises:
  obtaining, by the first communications device, frequency band information of the first frequency resource; and
  wherein before performing, by the first communications device, the channel state measurement on the second frequency resource of the first carrier to obtain the second CSI, the method further comprises:
    obtaining, by the first communications device, frequency band information of the second frequency resource.

16. The method according to claim 15, wherein obtaining, by the first communications device, frequency band information of the first frequency resource comprises:
  obtaining, by the first communications device, the frequency band information of the first frequency resource from preset information, or obtaining, by the first communications device, the frequency band information of the first frequency resource from notification information sent by the second communications device; and wherein obtaining, by the first communications device, frequency band information of the second frequency resource comprises:
   obtaining, by the first communications device, the frequency band information of the second frequency resource from preset information, or obtaining, by the first communications device, the frequency band information of the second frequency resource from notification information sent by the second communications device.

17. The method according to claim 11, wherein:
performing, by the first communications device, channel state measurement on the first frequency resource of a first carrier to obtain the first CSI comprises periodically performing, by the first communications device, channel state measurement on the first frequency resource of the first carrier to obtain the first CSI;

performing, by the first communications device, channel state measurement on the second frequency resource of the first carrier to obtain the second CSI comprises periodically performing, by the first communications device, channel state measurement on the second frequency resource of the first carrier to obtain the second CSI; and reporting, by the first communications device, information about the first CSI and information about the second CSI to a second communications device comprises periodically reporting, by the first communications device, the information about the first CSI and the information about the second CSI to the second communications device.

18. The method according to claim 11, wherein the second frequency resource is subject to potential adjacent channel interference from the terminal device, and the first frequency resource is subject to no potential adjacent channel interference from the terminal device.

* * * * *